(12) United States Patent
Brunet et al.

(10) Patent No.: US 11,294,943 B2
(45) Date of Patent: Apr. 5, 2022

(54) DISTRIBUTED MATCH AND ASSOCIATION OF ENTITY KEY-VALUE ATTRIBUTE PAIRS

(71) Applicant: INTERNATIONAL BUSINESS MACHINES CORPORATION, Armonk, NY (US)

(72) Inventors: Thomas A. Brunet, Round Rock, TX (US); Pushpalatha M. Hiremath, Bangalore (IN); Soma Shekar Naganna, Bangalore (IN); Willie L. Scott, II, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 639 days.

(21) Appl. No.: 15/835,680

(22) Filed: Dec. 8, 2017

(65) Prior Publication Data

US 2019/0179951 A1 Jun. 13, 2019

(51) Int. Cl.
| | |
|---|---|
| *G06F 16/33* | (2019.01) |
| *H04L 9/08* | (2006.01) |
| *G06N 7/02* | (2006.01) |
| *G06F 16/23* | (2019.01) |
| *G06F 16/2455* | (2019.01) |
| *G06F 16/25* | (2019.01) |
| *G06F 16/245* | (2019.01) |

(52) U.S. Cl.
CPC ...... *G06F 16/3337* (2019.01); *G06F 16/2365* (2019.01); *G06F 16/24553* (2019.01); *G06F 16/25* (2019.01); *G06N 7/02* (2013.01); *H04L 9/0819* (2013.01)

(58) Field of Classification Search
CPC ............................................. G06F 2203/04104
See application file for complete search history.

(56) References Cited

U.S. PATENT DOCUMENTS

| 6,393,587 B2 | 5/2002 | Bucher et al. |
| 7,047,521 B2 | 5/2006 | Bunnell |
| (Continued) | | |

OTHER PUBLICATIONS

Talburt et al., "Entity Information Life Cycle for Big Data," 2015 (Year: 2015).*

(Continued)

*Primary Examiner* — Yu Zhao
(74) *Attorney, Agent, or Firm* — Cantor Colburn LLP; Jared Montanaro

(57) ABSTRACT

Systems, methods, and computer-readable media are disclosed for associating and reconciling disparate key-value pairs corresponding to a target entity across multiple organizational entities using a distributed match. A shared output mapping may be generated that associates and reconciles common and/or conceptually aligned key-value pairs across the multiple organizational entities. The shared output mapping allows any given organizational entity to leverage information known to other organizational entities about a target entity. In this manner, the organizational entities participate in an information sharing ecosystem that enables each organizational entity to provide a user with a more optimally customized user experience based on the greater breadth of information available through the shared output mapping.

11 Claims, 9 Drawing Sheets

(56) References Cited

U.S. PATENT DOCUMENTS

| | | | |
|---|---|---|---|
| 7,194,731 B1 | 3/2007 | Cantrill | |
| 7,882,337 B2 | 2/2011 | Rivera | |
| 8,589,890 B2 | 11/2013 | Eccles et al. | |
| 9,348,728 B2 | 5/2016 | Beard | |
| 9,529,830 B1 | 12/2016 | Eshwar et al. | |
| 9,679,276 B1 | 6/2017 | Cuende | |
| 9,703,986 B1 | 7/2017 | Ashley et al. | |
| 2007/0255979 A1 | 11/2007 | Deily et al. | |
| 2009/0182728 A1 | 7/2009 | Anderson | |
| 2011/0276789 A1* | 11/2011 | Chambers | G06F 9/445 712/220 |
| 2012/0185478 A1* | 7/2012 | Topham | G06F 16/313 707/737 |
| 2014/0074764 A1* | 3/2014 | Duftler | G06Q 10/08 706/47 |
| 2015/0127940 A1 | 5/2015 | Polehn et al. | |
| 2016/0028552 A1 | 1/2016 | Spanos et al. | |
| 2016/0292672 A1 | 10/2016 | Fay et al. | |
| 2016/0321654 A1 | 11/2016 | Lesavich et al. | |
| 2016/0342977 A1 | 11/2016 | Lam | |
| 2017/0111175 A1 | 4/2017 | Oberhauser et al. | |

OTHER PUBLICATIONS

IBM, "IBM Entity Analytic Solutions V4.1.0 delivers powerful, anonymous identity recognition and relationship awareness," May 23, 2016 (Year: 2016).*

IBM, [online];[retrieved on Dec. 7, 2017]; retrieved fromthe Internet https://www-01.ibm.com/marketing/iwm/dre/signup?source=urx-20950&S_PKG=ov61731."IBM Blockchain PlatformTechnical Overview" IBM Registration Form, pp. 1-2.

Jun Xu et al.,"Automatic Diagnosis and Response To Memory Corruption Vulnerabilities", CCS')%, November 7-11, pp. 1-12.

Reuters [online];[retrieved on Dec. 7, 2017]; retrieved from the Internet—http://www.reuters.com/article/us-microsoft-accenture-digitalid-idUSKBN19A22B, Anna Irrera, "Accenture, Microsoft team upon blockchain-based digital ID network", Business News, Jun. 19, 2017, pp. 1-5.

Vaughan et al.; "Chainpoint, A Scalable Protocol for Recording Data in the Blockchain and Generating Blockchain Receipts," v1.0, Jul. 22, 2015.

Back, Adam et al., "Enabling blockchain innovations with pegged sidechains," Tech. Rep. [Online]. (Oct. 2014). retrieved at: http://www.blockstream.com/sidechains.pdf; 25 pgs.

Dittmer, R. "Fuzzy Matching Dirty Data | SAP Blogs" dated Feb. 12, 2015; 5 pgs.

Givre, Charles S. "Blockchain and UDF's", Published on Sep. 26, 2017; presentation at Apache Drill hackathon; retrieved from: https://www.slideshare.net/cgivre/blockchain-and-udfs; 10 pgs.

JSONLint—The JSON Validator "About JSONLint?", retrieved from https://jsonlint.com; downloaded Jul. 16, 2020, 2 pgs.

SAP Hana "How to use the Fuzzy Search" retrieved from: http://saphanatutorial.com/sap-hana-fuzzy-search/; Accessed Oct. 24, 2017; 5 pgs.

Xu, Jun et al, "Automatic Diagnosis and Response To Memory Corruption Vulnerabilities", CCS'05, Nov. 7-11, 2005; pp. 1-12.

* cited by examiner

DISTRIBUTED MATCH AND ASSOCIATION OF ENTITY KEY-VALUE ATTRIBUTE PAIRS

BACKGROUND

Blockchain technology allows for digital information to be distributed across a decentralized network. Governed blockchain refers to a blockchain environment in which transactions across the blockchain are managed by the participants in the blockchain. While a governed blockchain can ensure the integrity, privacy, and availability of data through a decentralized storage of hash values, conventional cross-organizational blockchain deployments suffer from a number of drawbacks, technical solutions to which are described herein.

SUMMARY

In one or more example embodiments of the disclosure, a method for distributed matching and association of key-value attribute pairs is disclosed. The method includes receiving, from a requestor, a query for attributes associated with a target entity and accessing aggregate key-value attribute pairs associated with a plurality of entities in response to receipt of the query. The method further includes identifying a subset of the aggregate key-value attribute pairs that correspond to the target entity and executing a key-value pair similarity algorithm on the subset of the aggregate key-value attribute pairs to generate a shared output mapping. The subset of the aggregate key-value attribute pairs includes at least a first set of key-value attribute pairs associated with a first organizational entity and a second set of key-value attribute pairs associated with a second organizational entity. The method additionally includes sending a response to the query to the requestor, where the response includes at least a portion of the shared output mapping.

In one or more other exemplary embodiments of the disclosure, a system for distributed matching and association of key-value attribute pairs is disclosed. The system includes at least one memory storing computer-executable instructions and at least one processor configured to access the at least one memory and execute the computer-executable instructions to perform a set of operations. The operations include receiving, from a requestor, a query for attributes associated with a target entity and accessing aggregate key-value attribute pairs associated with a plurality of entities in response to receipt of the query. The operations further include identifying a subset of the aggregate key-value attribute pairs that correspond to the target entity and executing a key-value pair similarity algorithm on the subset of the aggregate key-value attribute pairs to generate a shared output mapping. The subset of the aggregate key-value attribute pairs includes at least a first set of key-value attribute pairs associated with a first organizational entity and a second set of key-value attribute pairs associated with a second organizational entity. The operations additionally include sending a response to the query to the requestor, where the response includes at least a portion of the shared output mapping.

In one or more other exemplary embodiments of the disclosure, a computer program product for distributed matching and association of key-value attribute pairs is disclosed. The computer program product includes a non-transitory storage medium readable by a processing circuit, the storage medium storing instructions executable by the processing circuit to cause a method to be performed. The method includes receiving, from a requestor, a query for attributes associated with a target entity and accessing aggregate key-value attribute pairs associated with a plurality of entities in response to receipt of the query. The method further includes identifying a subset of the aggregate key-value attribute pairs that correspond to the target entity and executing a key-value pair similarity algorithm on the subset of the aggregate key-value attribute pairs to generate a shared output mapping. The subset of the aggregate key-value attribute pairs includes at least a first set of key-value attribute pairs associated with a first organizational entity and a second set of key-value attribute pairs associated with a second organizational entity. The method additionally includes sending a response to the query to the requestor, where the response includes at least a portion of the shared output mapping.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Example embodiments of the disclosure include, among other things, systems, methods, computer-readable media, techniques, and methodologies for associating and reconciling disparate key-value pairs corresponding to a target entity across multiple organizational entities using a distributed match. A shared output mapping may be generated that associates and reconciles common and/or conceptually aligned key-value pairs across the multiple organizational entities. The shared output mapping allows any given organizational entity to leverage information known to other organizational entities about the target entity. In this manner, the organizational entities participate in an information sharing ecosystem that enables each organizational entity to provide a user with a more optimally customized user experience based on the greater breadth of information available through the shared output mapping.

In certain example embodiments, the multiple organizational entities may be participants in a governed blockchain. In an example implementation, a governed blockchain may include at least two participant organizational entities: ORG_A and ORG_B. A user may be added to the blockchain and logically associated with ORG_A. In particular, the user may be assigned a set of attributes SET_A (e.g., key-value attribute pairs) that is associated with ORG_A. The user may then be logically associated with a secondary organization ORG_B and a secondary set of attributes SET_B assigned to the user may be associated with ORG_B. SET_A and SET_B may contain attributes that are not identical but that are conceptually aligned. For example, key-value pairs in SET_A and SET_B may have different labeling conventions but may be intended to convey the same information in both ORG_A and ORG_B.

In certain example embodiments, the user may be required to opt-in to allow cross-organizational data sharing for the user across the blockchain. Cross-organizational data sharing may, for example, provide ORG_A with visibility to SET_B and may similarly provide ORG_B with visibility to SET_A. However, because the labeling conventions for user attributes may differ between ORG_A and ORG_B, ORG_A may be unable to derive meaning from or utilize the information in SET_B. The same may hold true with respect to ORG_B and the information in SET_A. Thus, conventional information sharing alone across disjoint organizational entities is insufficient to enable the organizational entities to leverage one another's known information about a user (e.g., make use of key-value attribute pairs created with respect to other organizational entities). Example embodiments of the disclosure, however, enable disjoint organizational entities to leverage one another's information about a user by executing a distributed match and sequence alignment algorithm to generate a shared output mapping that reconciles and associates key-value attribute pairs across the set of disjoint organizational entities.

Figure 1:
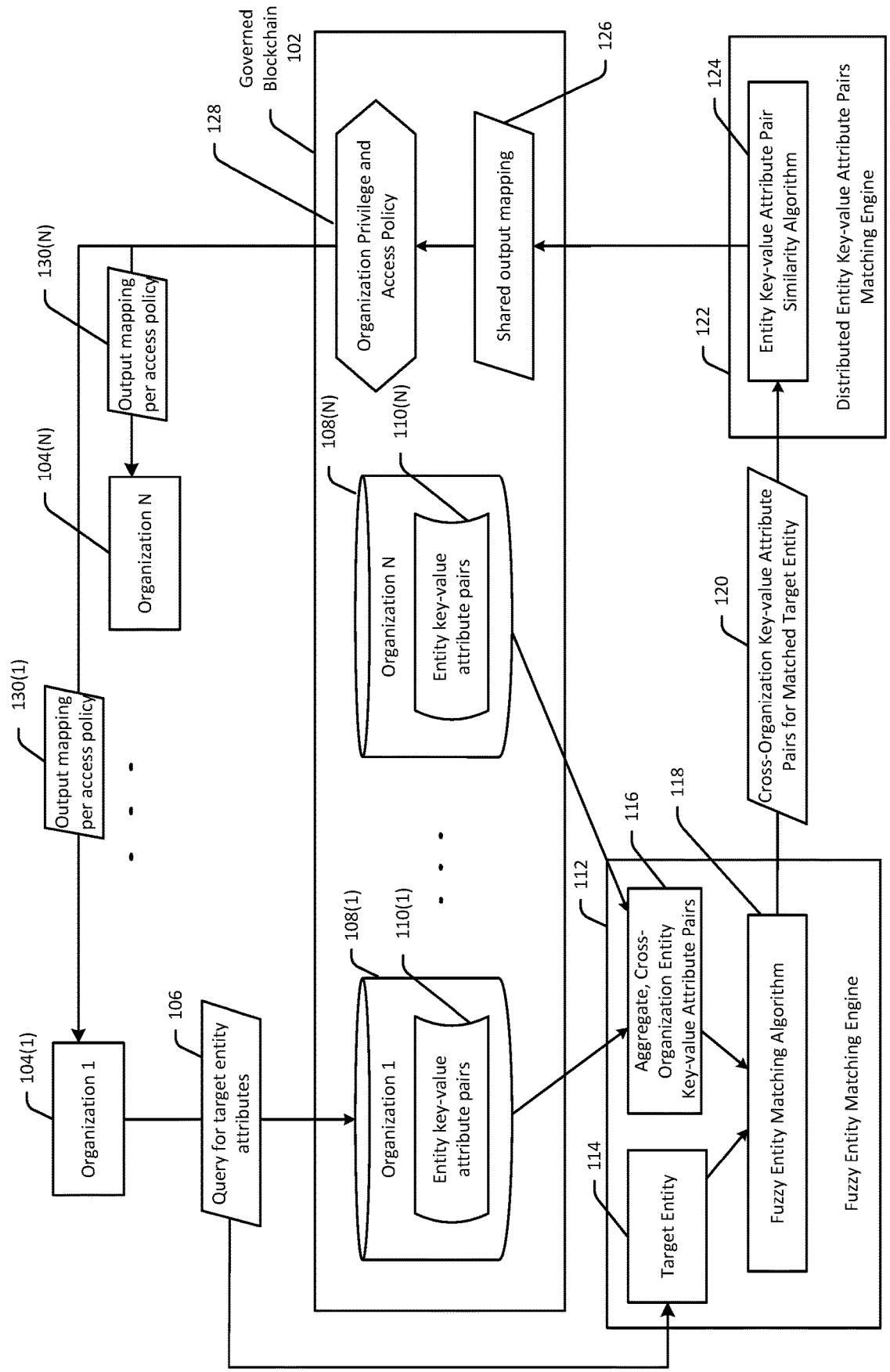
FIG. 1 is a schematic hybrid data flow/block diagram illustrating distributed match and association of entity key-value attribute pairs across a governed blockchain in accordance with example embodiments of the disclosure.

FIG. 1 is a schematic hybrid data flow/block diagram illustrating distributed match and association of entity key-value attribute pairs across a governed blockchain 102. The blockchain 102 may include multiple, disjoint organizations such as, for example, organization 1 (ORG_1) 104(1) through organization N (ORG_N) 104(N). Any given organization in the blockchain 102 may be referred to hereinafter generically as organization 104 or ORG 104. Each organization 104 in the blockchain 102 may associate a respective set of key-value attribute pairs with each of one or more entities (e.g., users). For example, entity key-value attribute pairs 110(1) to 110(N) may be associated with ORG_1 104(1) through ORG_N 104(N), respectively. More specifically, in certain example embodiments, organizations 104(1)-104(N) may have access to respective repositories 108(1)-108(N) storing respective entity key-value attribute pairs 110(1)-110(N).

As previously noted, in conventional blockchain deployments, either each organization 104 does not have access to the entity key-value attribute pairs of other organizations 104, or even if information sharing is permitted, an organization (e.g., ORG_1 104(1)) may be unable to make sense of the key-value attribute pairs associated with another organization (e.g., ORG_N 104(N)) due to differences in the labeling conventions of keys between the organizations. Example embodiments of the disclosure provide a technical solution to this and other technical problems associated with conventional blockchain deployments by executing an algorithm to generate a shared output mapping that—for any given entity—associates and reconciles key-value attribute pairs associated with the entity across the entity key-value attribute pairs 110(1)-110(N) and allows an organization 104 to leverage, in addition to its own entity attributes, the entity attributes associated with other organizations 104 in the blockchain 102.

Figure 2:
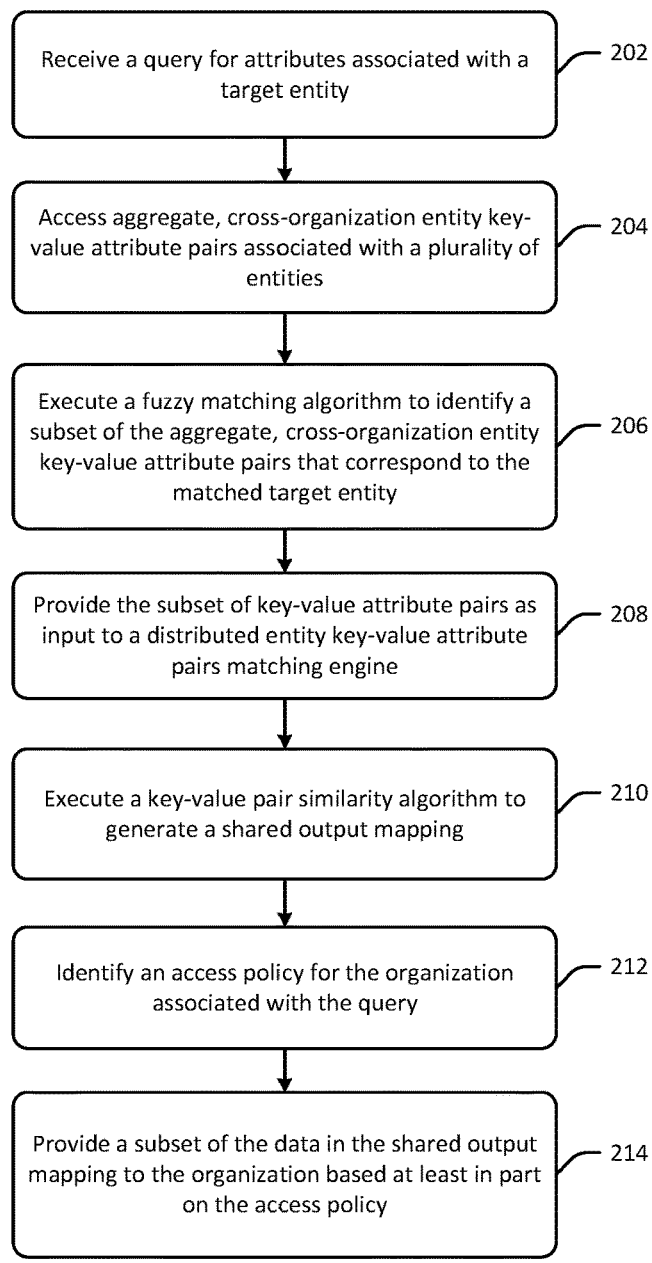
FIG. 2 is a process flow diagram of an illustrative method for generating a shared output mapping for a target entity and providing at least a portion of the shared output mapping to a requesting organizational entity in response to a query for attributes associated with the target entity in accordance with one or more example embodiments of the disclosure.
Figure 3A:
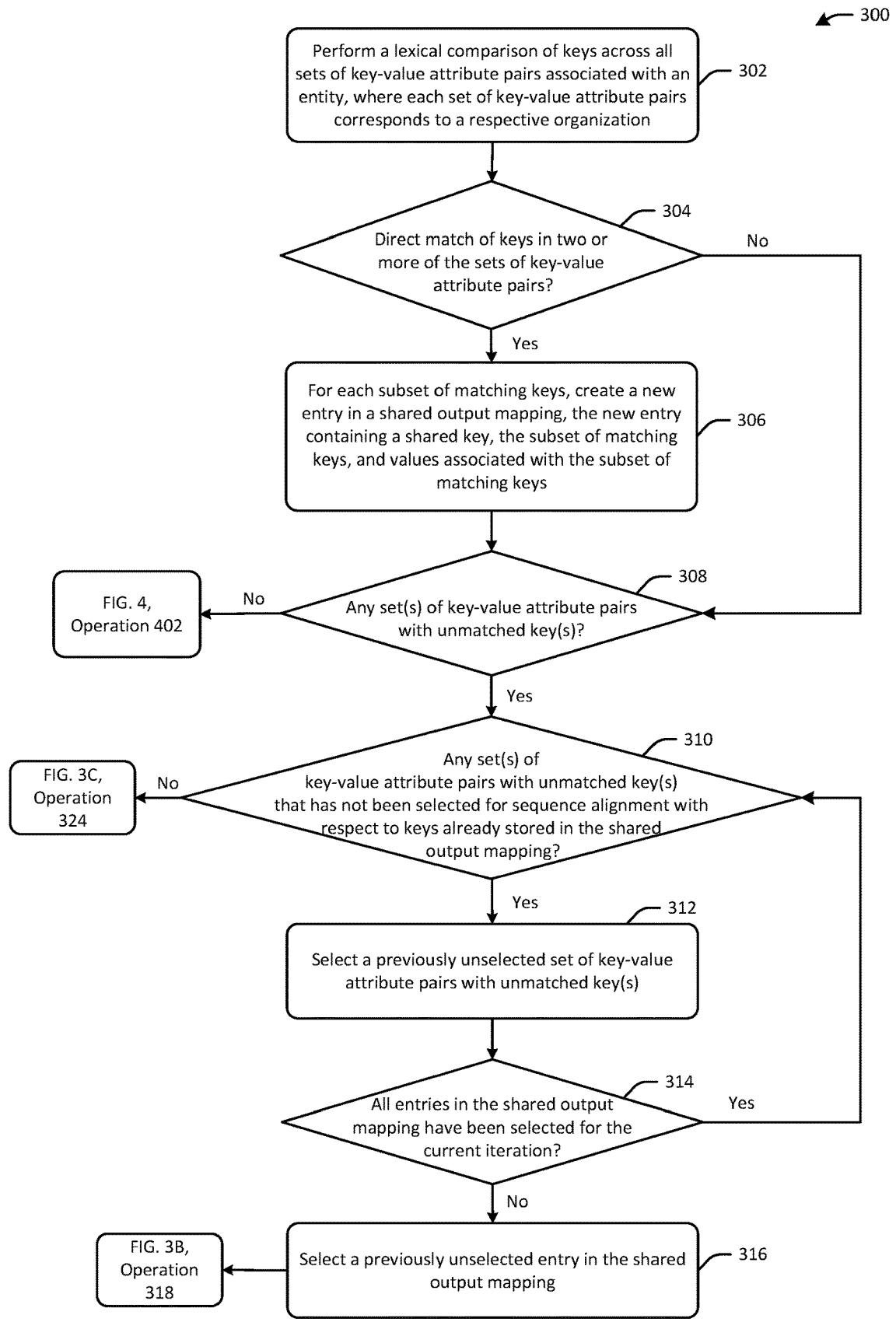
FIGS. 3A, 3B, 3C, 3D, and 3E are process flow diagrams of an illustrative method for executing a key-value pair sequence alignment algorithm to generate a shared output mapping in accordance with one or more example embodiments of the disclosure.

FIG. 2 is a process flow diagram of an illustrative method 200 for generating a shared output mapping for a target entity and providing at least a portion of the shared output mapping to a requesting entity in response to a query for attributes associated with the target entity. FIGS. 3A-3E are process flow diagrams of an illustrative method 300 for executing a key-value pair sequence alignment algorithm to generate the shared output mapping. FIG. 4 is a process flow diagram of an illustrative method 400 for flagging dissimilar or conflicting key values in the shared output mapping. FIGS. 2-4 will each be described in conjunction with FIG. 1 hereinafter.

Various illustrative methods of the disclosure and corresponding data structures associated therewith will now be described. It should be noted that each operation of any of the methods 200-400 may be performed by one or more of the engines or the like depicted in FIG. 1 or 5, whose operation will be described in more detail hereinafter. These engines or the like may include one or more program modules that may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments of the disclosure may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Referring first to FIG. 2, at block 202 of the method 200, a fuzzy entity matching engine 112 may receive a query 106 for attributes associated with a target entity 114 (e.g., a target user). The query 106 may be received from a requesting entity such as ORG_1 104(1). For example, the query 106 may include an organizational identifier that identifies the query 106 as coming from a device associated with ORG_1 104(1). The query 106 may also include an identifier of the target entity 114 by which the target entity 114 is known to ORG_1.

At block 204 of the method 200, the fuzzy entity matching engine 112 may access aggregate, cross-organizational entity key-value attribute pairs 116 associated with a plurality of entities registered with the blockchain 102. For example, the fuzzy entity matching engine 112 may access the respective repositories 108(1)-108(N) to access the respective entity key-value attributes pairs 110(1)-110(N) associated with each organization 104(1)-104(N). Thus, the aggregate, cross-organizational key-value attribute pairs 116 may include the respective sets of entity key-value attribute pairs 110(1)-110(N) associated with each organization 104 (1)-104(N) across the blockchain 102, each of which may, in turn, include respective subsets of key-value pairs associated with each of multiple users.

After accessing the aggregate, cross-organizational key-value attribute pairs 116, the fuzzy entity matching engine 112 may execute a fuzzy matching algorithm 118 at block 206 of the method 200 to match the target entity 114 across the multiple organizations 104(1)-104(N) of the blockchain 102 and identify a subset 120 of the aggregate, cross-organizational entity key-value attribute pairs 116 that correspond to the matched target entity. Then, at block 208 of the method 200, the fuzzy entity matching engine 112 may provide the subset 120 of entity key-value attribute pairs associated with the matched target entity to a distributed entity key-value attribute pairs matching engine 122.

At block 210 of the method 200, the distributed entity key-value attribute pairs matching engine 122 may execute a key-value pair similarity algorithm 124 to generate a shared output mapping 126. In certain example embodiments, the key-value pair similarity algorithm 124 may be a sequence alignment algorithm that includes a sequence alignment phase, which will be described in more detail with reference to FIGS. 3A-3E, and a pruning phase, which will be described in more detail with reference to FIG. 4. While example embodiments of the disclosure are described herein in connection with a similarity algorithm 124 that is a sequence alignment algorithm that utilizes edit distances as similarity metrics, it should be appreciated that any suitable algorithm that calculates a similarity metric between values and uses the similarity metric to determine the extent of similarity (or dissimilarity) between the values can be used.

The shared output mapping 126 may include one or more entries. Each entry may include a set of organization-specific keys associated with the target entity 114 and their corresponding organization-specific key values. Each entry may further include a shared key commonly associated with each of the organization-specific keys in the entry. Thus, the shared output mapping 126 may provide each organization 104(1)-104(N) in the blockchain 102 with access to key-value attribute pairs created for a user in other organizations.

In certain example embodiments, a given organization 104 may not be provided with access to all of the information in the shared output mapping 126. For example, ORG_1 104(1) and ORG_N 104(N) may be competitors who desire to share some information with each other about a common target entity 114 to provide a better user experience, but who do not wish to share all information known to each organization. In such example embodiments, an access policy associated with the organization from whom the query 106 is received (e.g., ORG_1 104(1)) may be identified at block 212 of the method 200. Then, at block 214 of the method 200, a subset of the data in the shared output mapping 126 which the requesting organization is authorized to access may be identified and provided to the requesting organization. For instance, ORG_1 104(1) may only be provided with a subset 130(1) of the shared output mapping 126 based at least in part on the access policy associated with ORG_1 104(1). Similarly, other organizations that subsequently submit queries for attributes associated with the target entity 114 may also receive only that portion of the shared output mapping 126 that they are authorized to access based on their corresponding access policies. For instance, if ORG_N 104(N) were to subsequently submit a query for attributes associated with the target entity 114, ORG_N 104(N) may be provided with a subset 130(N) of the shared output mapping 126 based on the access policy corresponding to ORG_N.

In an example implementation, Company X, Company Y, and Company Z may be online marketplaces for goods and services and may have corresponding logical organizations ORG_X, ORG_Y, and ORG_Z on the governed blockchain 102. While only three organizations are described as part of the blockchain 102 in this example, it should be appreciated that the blockchain 102 may contain any number of logical organizations corresponding to any number of companies participating in the blockchain 102.

A user Jane may create an account with Company X, for example. As part of this process, user Jane may create a profile with Company X indicating her user interface (UI) and purchase preferences, which may be stored as key-value attribute pairs in a corresponding repository in the blockchain 102 (e.g., a repository associated with ORG_X). The user Jane may similarly create a profile with Company Y, and her UI and purchase preferences specified as part of this process may be stored as key-value attribute pairs in a repository in the blockchain 102 associated with ORG_Y. User Jane may then create an account with Company Z, but may specify no or a limited number of UI or purchase preferences for Company Z. For instance, upon registering with Company Z, a record for user Jane may be stored in the governed blockchain 102 in a repository associated with ORG_C, but may be sparsely populated as a result of having little or no information on Jane's purchase or UI preferences.

User Jane's registration with Company Z may trigger creation (or updating) of a shared output mapping containing key-value attributes pairs for Jane across the organizations of the blockchain 102. More specifically, user Jane's registration with company Z may trigger the query 106 for attributes associated with user Jane who, in this example, is the target entity 114. Upon receipt of the query 106, the fuzzy entity matching engine 112 may execute the fuzzy entity matching algorithm 118 to match user Jane across the different organizations of the blockchain 102 (e.g., ORG_X, ORG_Y, and ORG_Z) and determine a respective set of key-value attribute pairs for user Jane for each organization in the blockchain 102.

While each set of key-value attribute pairs for user Jane may contain any number of attributes, only three attributes will be described in this example for ease of explanation. For instance, ORG_X, ORG_Y, and ORG_Z may be associated with the following sets of key-value attribute pairs, respectively: {dispMode:grayscale, fontsize:12, lang:English}; {dispMode:grayscale, fontsze:12, lang:English}; and {displayMode:NULL, font:NULL, communicationpref:English}. These sets of key-value attribute pairs for user Jane may be provided as input to the distributed entity key-value attribute pair matching engine 122, which may execute the entity key-value attribute pair similarity algorithm 124 to generate the shared output mapping 126 for user Jane across ORG_X, ORG_Y, and ORG_Z, which will be described in more detail hereinafter. It should be appreciated that while a JavaScript Object Notation (JSON) map may be used to illustratively describe key-value attribute pairs and the shared output mapping 126, any suitable data representation may be employed.

More generally, given a target entity 114 that is associated with N organizations 104(1)-104(N) across the blockchain 102, $A_1, A_2, \ldots, A_N$ may denote the key-value attribute pair sets for the target entity 114, for each organization. For instance, $A_1$ may denote the set of key-value attribute pairs for the target entity 114 that is associated with ORG_1 104(1), $A_2$ may denote the set of key-value attribute pairs for the target entity 114 that is associated with ORG_2 104(2), and so forth. The number of key-value attribute pairs in each set ($|A_i|$) may be different. In addition, while the labeling conventions of the key-value attribute pairs may differ across $A_1, A_2, \ldots, A_N$, a subset of key-value attribute pairs that are labeled differently may nonetheless be conceptually aligned, and thus, meant to convey the same information. In the example introduced earlier, N=3 and $A_1$, $A_2$, and $A_3$ correspond to the example sets of key-value attribute pairs associated with ORG_X, ORG_Y, and ORG_Z, respectively.

The sequence alignment phase of an illustrative similarity algorithm 124 (an entity key-value attribute pair sequence alignment algorithm) will now be described in detail with reference to FIGS. 3A-3E. Referring first to FIG. 3A, at block 302 of the method 300, the distributed entity key-value attribute pairs matching engine 122 may execute the entity key-value attribute pair sequence alignment algorithm 124 to perform a lexical comparison of keys across all sets $A_1, A_2, \ldots, A_N$ of key-value attribute pairs associated with a given target entity 114. In the example introduced earlier, the lexical comparison would be performed across sets $A_1$, $A_2$, and, $A_3$ which correspond to {dispMode:grayscale, fontsize:12, lang:English}; {dispMode:grayscale, fontsze:12, language: English}; and {displayMode:NULL, font:NULL, communicationpref:English}, respectively.

At block 304 of the method 300, the engine 122 may execute the algorithm 124 to determine whether there is a direct match of keys in two or more of the sets of key-value attribute pairs $A_1, A_2, \ldots, A_N$. In response to a positive determination at block 304, the engine 122 may create a new entry in the shared output mapping 126 for each subset of keys determined to directly match at block 306 of the method 300. Each such entry created at block 306 may contain a shared key that is used as a common representation of a subset of corresponding keys that directly match, the matching keys themselves, and values associated with the matching keys. The entry may further include an organization identifier (id) for each organization having a corresponding key in the entry. More generally, each entry in the shared output mapping 126 may contain: 1) a shared key that represents a subset of organization-specific keys that are common or conceptually aligned across multiple organizations; 2) the organization-specific keys themselves (which may adhere to different labeling conventions); 3) an organization id for each organization having a corresponding organization-specific key in the entry; and 4) a set of organization-specific values, where each value corresponds to a particular organization-specific key for a particular organization.

Referring again to the example introduced earlier, the lexical comparison at block 302 may be performed across sets $A_1$, $A_2$, and, $A_3$ which correspond to {dispMode:grayscale, fontsize:12, lang:English}; {dispMode:grayscale, fontsze:12, language: English}; and {displayMode:NULL, font:NULL, communicationpref:English}, respectively. In this example, a positive determination would be made at block 304 because the organization-specific key "dispMode" in set $A_1$ directly matches the organization-specific key "dispMode" in set $A_2$. Thus, an entry would be created in the shared output mapping 126 that contains a shared key, the key-value attribute pair "dispMode: grayscale" from set $A_1$, the key-value attribute pair "dispMode: grayscale" from set $A_2$, and organization-specific ids for ORG_1 and ORG_2. In certain example embodiments, because there is a direct match of organization-specific keys, the shared key may also be selected to directly match the organization-specific keys. For instance, in the example implementation being described, the shared key for the entry that is created may be "dispMode." Further, in the example implementation being described, only one entry would be created at block 306 because "dispMode" in set $A_1$ and "dispMode" in set $A_2$ constitute the only subset of organization-specific keys that directly match across the sets $A_1$, $A_2$, and, $A_3$. However, more generally, it should be appreciated that any number of subsets of directly matching organization-specific keys may be identified at block 304, and thus, any number of corresponding shared output mapping entries may be generated at block 306.

An example JSON representation of the shared output mapping entry that would be created at block 306 in this example is shown below.

```
"dispMode": {
    "keyValuePairs": [{
        "organization_id": "CompanyX",
        "organization_key": "dispMode",
        "organization_value": "grayscale"
    }, {
        "organization_id": "CompanyY",
        "organization_key": "dispMode",
        "organization_value": "grayscale"
    }]
}
```

Either in response to a negative determination at block 304 (in which case no directly matching organization-specific keys are identified) or from block 306, the method 300 may proceed to block 308, where the engine 122 may execute the algorithm 124 to determine whether any set(s) of key-value attribute pairs with unmatched key(s) remain. In particular, the engine 122 may determine at block 308 whether any of sets $A_1, A_2, \ldots, A_N$ contain at least one organization-specific key that has not yet been determined to be in common with or conceptually aligned with other key(s) associated with other organization(s). In response to a negative determination at block 308 indicating that no set of key-value attribute pairs with unmatched key(s) remains, the method 300 may end and the method 400 (a pruning phase) may be initiated at block 402. In certain example embodiments, the pruning phase may not be necessary and may be skipped if all keys across sets $A_1, A_2, \ldots, A_N$ directly match.

However, in response to a positive determination at block 308, the method may proceed to block 310. Blocks 310-322 of the method 300 may represent an iterative sub-process for performing sequence alignment of unmatched organization-specific key(s) with respect to keys already stored in the shared output mapping 126. In the example introduced earlier, the method 300 may proceed to block 310 because $A_1$ may include the unmatched keys "fontsize" and "lang"; $A_2$ may include the unmatched keys "fontsze" and "language"; and $A_3$ may include the unmatched keys "displayMode," "font," and "communicationpref" The iterative sub-process of blocks 310-322 will be described hereinafter using this example.

At block 310 of the method 300, the engine 122 may execute the algorithm 124 to determine whether any of the sets $A_1$, $A_2$, and, $A_3$ of key-value attribute pairs with unmatched keys have not yet been selected for sequence alignment with respect to organization-specific keys already stored in the shared output mapping 126. In accordance with example embodiments of the disclosure, a flag or the like may be set to indicate whether a particular process or sub-process has or has not been performed. In a first iteration, all sets $A_1$, $A_2$, and, $A_3$ has not yet been selected, and as such, a positive determination may be made at block 310. Then, at block 312 of the method 300, the engine 122 may execute the algorithm 124 to select a previously unselected set of key-value attribute pairs with unmatched key(s). For example, set $A_1$ may be selected at block 312.

Then, at block 314 of the method 300, the engine 122 may execute the algorithm 124 to determine whether all entries in the shared output mapping 126 have been selected for the current iteration. In response to a negative determination at block 314 indicating that one or more entries in the shared output mapping 126 have not been selected for the current iteration, the method 300 may proceed to block 316 where an entry in the shared output mapping 126 that has not yet been selected for the current iteration may be selected. Referring again to the example introduced earlier, at this point in the process, the shared output mapping 126 includes only a single entry containing the shared key "dispMode," the organization-specific key "dispMode" from set $A_1$, and the directly matching organization-specific key "dispMode" from set $A_2$. This entry may be selected at block 316. The method 300 may then proceed to block 318.

The algorithm 124 may utilize pointers, counters, or the like to track which sets of key-value attribute pairs with unmatched key(s) have or have not been selected and which shared output mapping entries have or have not been selected for a given iteration. For example, with each iteration, a pointer may be updated to point to the next unselected set of key-value attribute pairs with unmatched key(s) until no set with unmatched key(s) remains for the pointer to be updated to, at which point, the iterative sub-process of blocks 310-322 may end. Alternatively, a counter may be incremented or decremented with each iteration until the counter reaches a threshold value indicating that no set of key-value attribute pairs with unmatched key(s) remains. A pointer or counter may similarly be used to determine when all entries in the shared output mapping 126 have been selected for a particular iteration of the iterative sub-process of blocks 310-322.

Figure 3B:
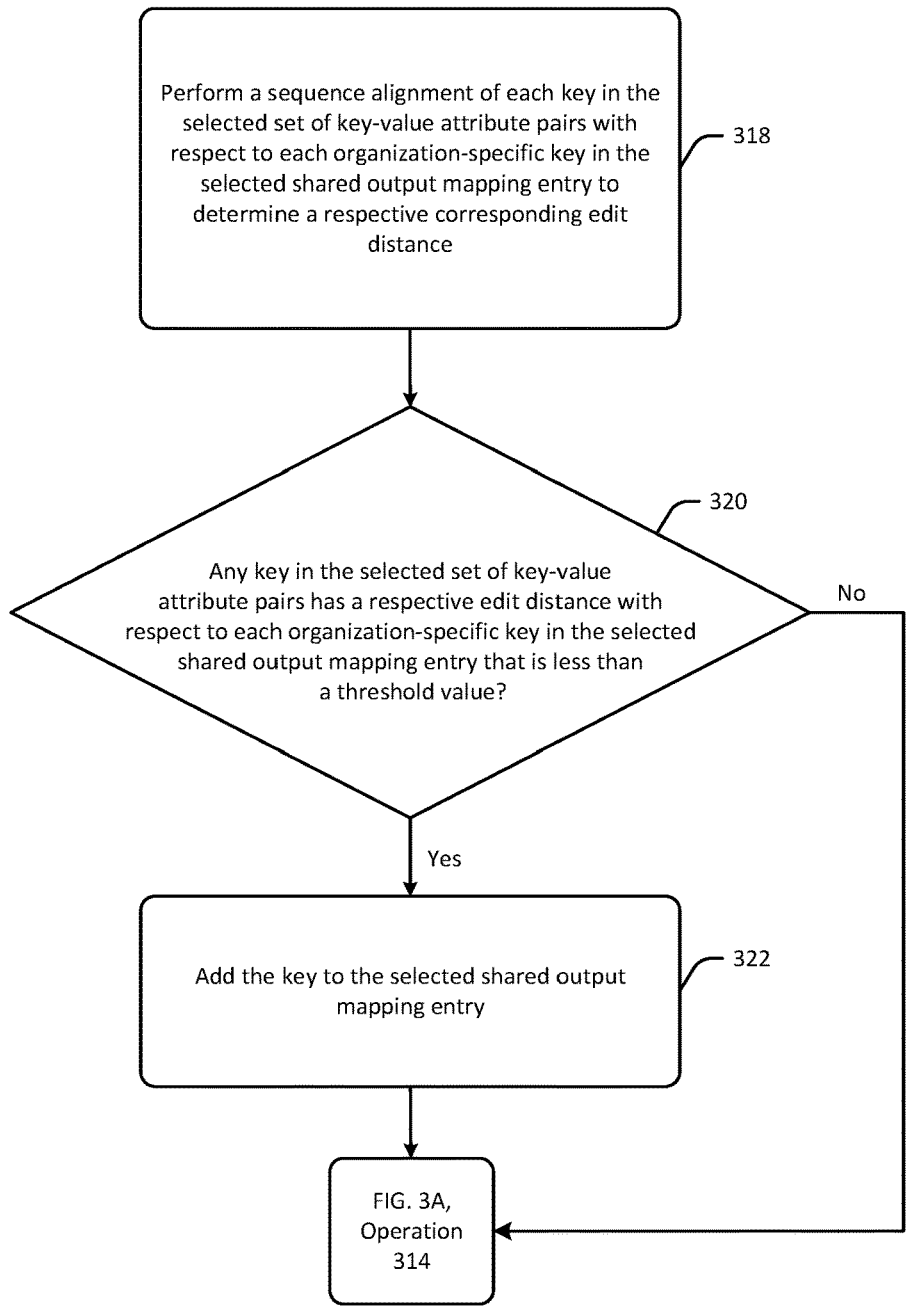
Figure 4:
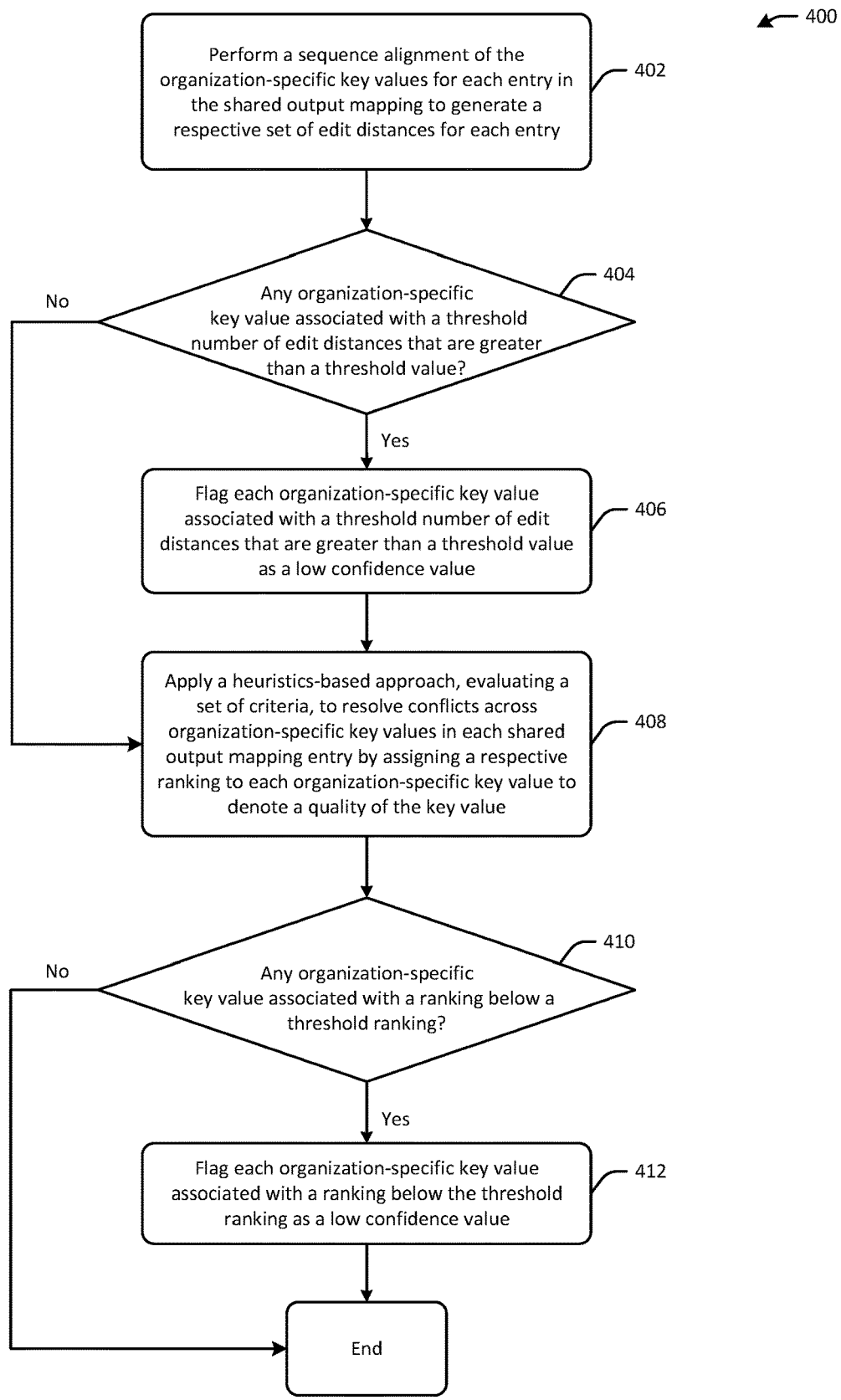
FIG. 4 is a process flow diagram of an illustrative method for flagging dissimilar or conflicting key values in a shared output mapping in accordance with one or more example embodiments of the disclosure.

Referring now to FIG. 3B, at block 318 of the method 300, the engine 122 may execute the algorithm 124 to perform a sequence alignment of each key in the selected set of key-value attribute pairs with respect to each organization-specific key contained in the selected shared output mapping entry to determine a respective corresponding edit distance. The sequence alignment performed at block 318 may be, for example, any suitable technique for quantifying the similarity (or dissimilarity) of two strings. The edit distance may be a metric for quantifying this similarity (or dissimilarity) between strings and may represent the minimum number of operations required to transform one string into the other. An example type of edit distance metric that may be used is the Levenshtein distance. In certain example embodiments, any edit distance determined may be normalized with respect to the values (keys or key values) with respect to which the edit distance is determined. As a non-limiting example, by normalizing edit distances, the same edit distance may represent a greater degree of similarity for strings of longer length than strings of shorter length.

At block 320 of the method 300, the engine 122 may execute the algorithm 124 to determine whether any key in the selected set of key-value attribute pairs has a respective edit distance with respect to each organization-specific key in the selected shared output mapping entry that is less than (or equal to) a threshold value such as a threshold edit distance. Thus, the engine 122 may determine at block 320 whether any key in the selected set of key-value attribute pairs is sufficiently similar (conceptually aligned) to each organization-specific key contained in the selected shared output mapping entry (as indicated by the respective edit distance between the key and each organization-specific key meeting a threshold value) to warrant inclusion of the key in the selected shared output mapping entry.

In response to a positive determination at block 320, the key identified at block 320 may be added to the selected shared output mapping entry at block 322 of the method 300. More specifically, the organization id corresponding to the organization associated with the selected set of key-value attribute pairs; the organization-specific key contained in the selected set of key-value attributes pairs that is determined to have a respective edit distance that is less than a threshold value with respect to each organization-specific key in the selected shared output mapping entry; and the organization-specific value corresponding to the organization-specific key may all be added to the selected shared output mapping entry. From block 322, the method 300 may return to block 314. In response to a negative determination at block 320, the method 300 may also return to block 314, but without adding any unmatched key to the selected shared output mapping entry.

Referring again to the example introduced earlier, in a first iteration of the sub-process of blocks 310-322, the selected set of key-value attribute pairs containing unmatched keys is $A_1$ and the shared output mapping entry contains the shared key "dispMode" and the organization-specific key "dispMode" from set $A_1$ and the directly matching organization-specific key "dispMode" from set $A_2$. $A_1$ includes the unmatched keys "fontsize" and "lang." Assuming that neither of these keys has an edit distance with "dispMode" that is less than a threshold edit distance, a negative determination may be made at block 320, and the method 300 may return to block 314, where the engine 122 may execute the algorithm 124 to again determine whether all entries in the shared output mapping have been selected for the current iteration.

Because there is only one entry in the shared output mapping 126 in this example, a positive determination is made at block 314, and the method 300 returns to block 310. Further, because there remain sets of key-value attribute pairs with unmatched keys (specifically, $A_2$ and $A_3$) that have not been selected for sequence alignment with respect to keys already stored in the shared output mapping 126, a positive determination is made at block 310 and a next previously unselected set of key-value attribute pairs with unmatched keys (e.g., set $A_2$) may be selected at block 312. Because the selection of set $A_2$ represents the start of a new iteration of the sub-process of blocks 310-322, a negative determination is made at block 314 and the single shared output mapping entry containing the shared key "dispMode," the organization-specific key "dispMode" from set $A_1$, and the organization-specific key "dispMode" from set $A_2$ may be selected at block 316.

Set $A_2$ includes the unmatched keys "fontsze" and "language." Assuming that neither of these keys has an edit distance with "dispMode" that is less than a threshold edit distance, a negative determination may again be made at block 320, and the method 300 may again return to block 314, where the engine 122 may execute the algorithm 124 to again determine whether all entries in the shared output mapping have been selected for the current iteration. As previously noted, because there is only one entry in the shared output mapping 126 in this example, a positive determination is once again made at block 314, and the method 300 again returns to block 310. Further, because there remains a set of key-value attribute pairs with unmatched keys (specifically $A_3$) that has not been selected for sequence alignment with respect to keys already stored in the shared output mapping 126, a positive determination is made at block 310 and a next previously unselected set of key-value attribute pairs with unmatched keys (e.g., set $A_3$) is selected at block 312. Because the selection of set $A_3$ represents the start of a new iteration of the sub-process of blocks 310-322, a negative determination is made at block 314 and the same single shared output mapping entry is again selected at block 316.

The selected set $A_3$ for the current iteration includes the organization-specific keys "displayMode," "font," and "communicationpref" It is likely that neither the key "font" nor the key "communicationpref" has an edit distance with "dispMode" that is less than a threshold edit distance. However, assuming that the key "displayMode" has an edit distance with each organization-specific key contained in the selected shared output mapping entry (e.g., "dispMode" from set A1 and "dispMode" from set A2) that is less than the threshold edit distance, a positive determination may be made at block 320, and the key "displayMode" may be added to the selected shared output mapping entry. An organization id corresponding to the organization associated with set $A_3$ as well as the organization-specific value corresponding to the key "displayMode" may also be added to the selected shared output mapping entry.

The method 300 may then proceed to block 314, where a positive determination is made because the single entry in the shared output mapping 126 has already been selected for the current iteration. The method 300 may then proceed to block 310, where a negative determination is made because all sets $A_1$, $A_2$, and $A_3$ of key-value attribute pairs with unmatched keys have been selected for sequence alignment with respect to keys already stored in the shared output mapping 126. In response to a negative determination at block 310, the method may proceed to block 324.

An example JSON representation of the single shared output mapping entry at this stage in the method 300 with respect to the example being described is shown below.

```
"dispMode": {
    "keyValuePairs": [{
        "organization_id": "CompanyX",
        "organization_key": "dispMode",
        "organization_value": "grayscale"
    }, {
        "organization_id": "CompanyY",
        "organization_key": "dispMode",
        "organization_value": "grayscale"
    }, {
        "organization_id": "CompanyZ",
        "organization_key": "displayMode",
        "organization_value": "NULL"
    }]
}
```

In certain example embodiments, subsequent to and/or prior to performing the sequence alignment with respect to existing organization-specific keys in the shared output mapping 126, the engine 122 may determine whether language translation may be advantageous for determining the edit distances between unmatched keys and keys stored in the shared output mapping 126. The engine 122 may evaluate various inputs that may be potentially indicative of data being stored in different languages for different organizations in the blockchain 102. Such inputs may include, for example, a geographic location associated with the target entity 114, geographic locations associated with organizations 104(1)-104(N) in the blockchain 102, any language preferences specified by the entity 114 when registering with organizations in the blockchain 102, and so forth. If the engine 122 determines that language translation is advantageous, the engine 122 may perform the language translation prior to and/or subsequent to performing the sequence alignment of unmatched key(s) with respect to existing keys stored in the shared output mapping 126. In certain example embodiments, the sequence alignment of unmatched key(s) with respect to existing keys stored in the shared output mapping 126 may be repeated after performing language translation.

Figure 3C:
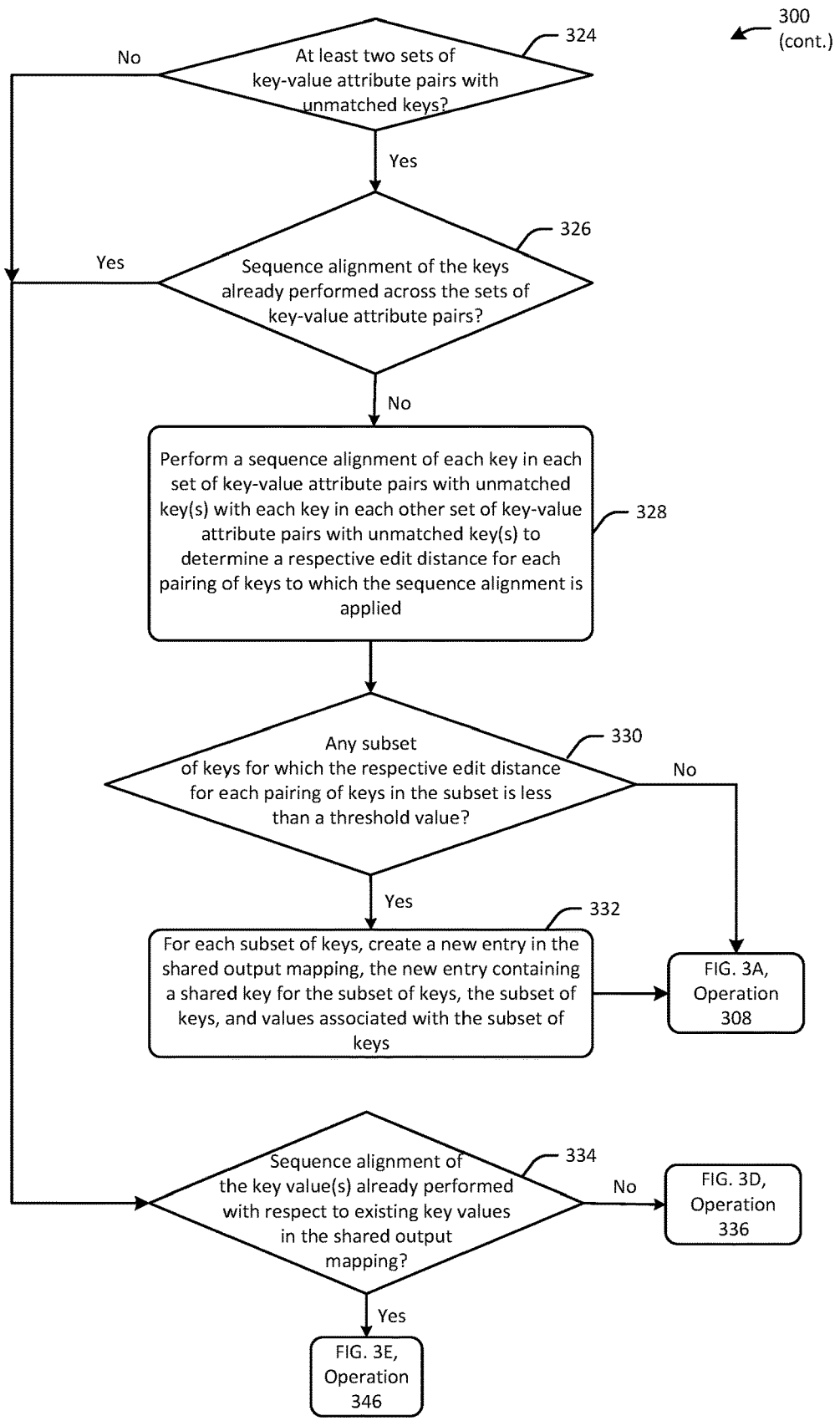
Figure 3D:
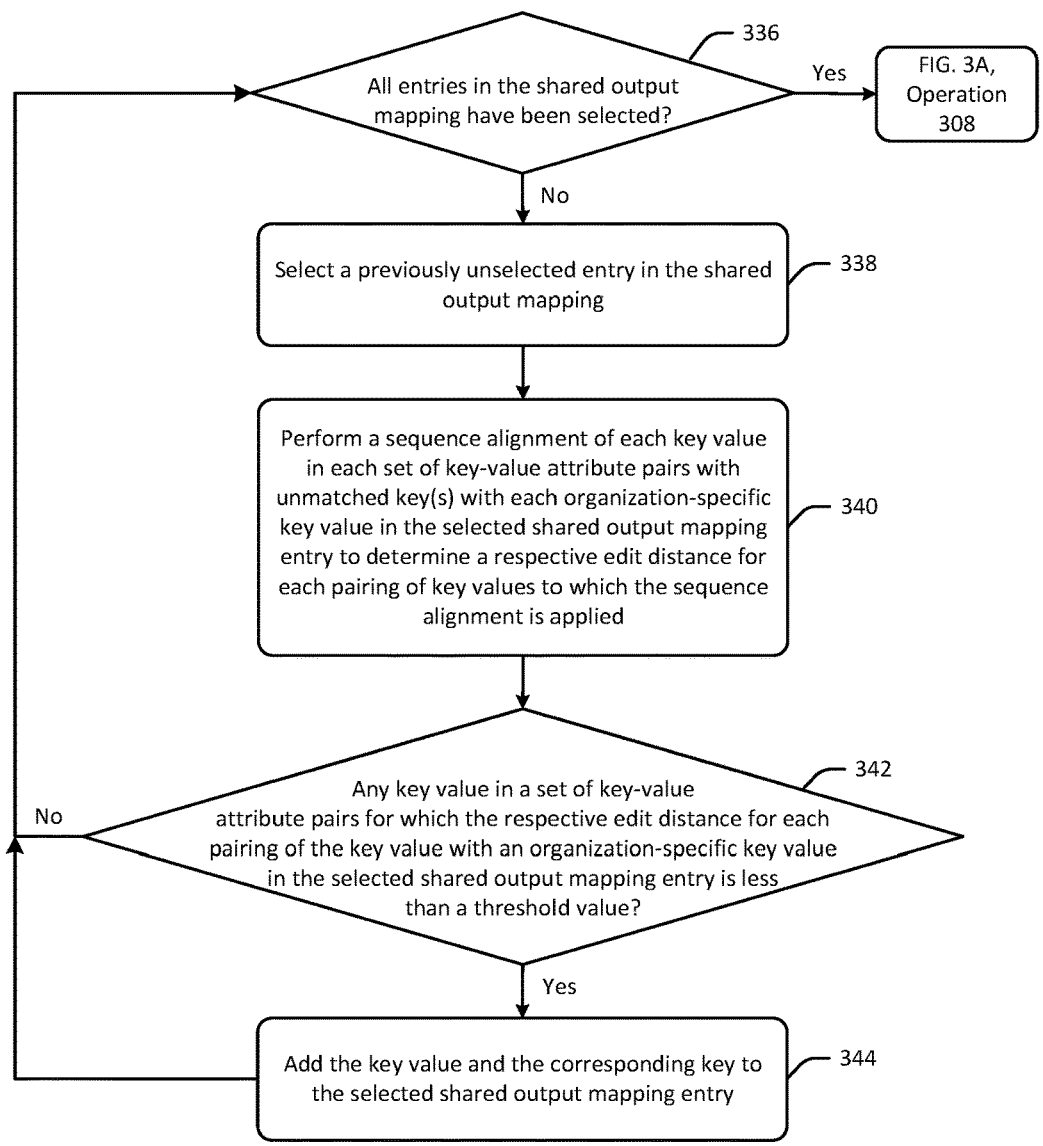
Figure 3E:
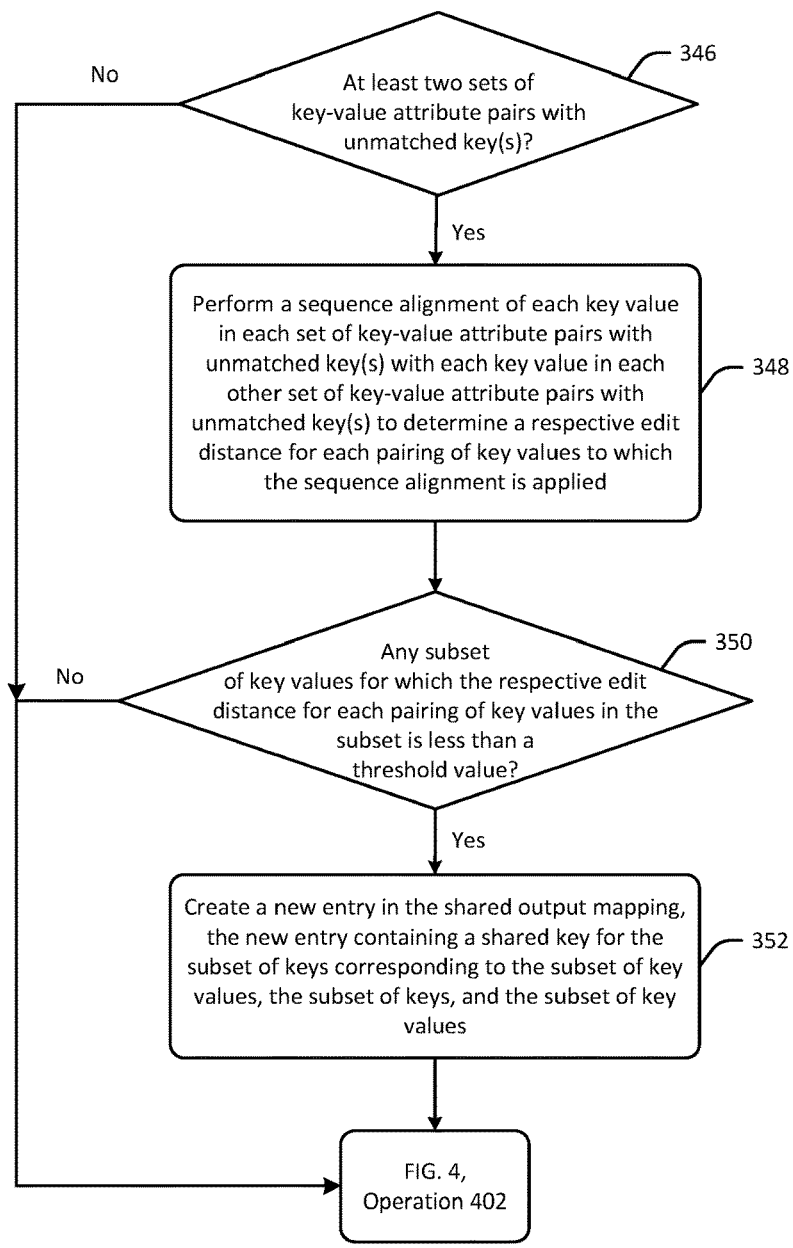

Following the iterative sub-process of blocks 310-322 for performing sequence alignment with respect to existing keys in the shared output mapping 126, an iterative sub-process for performing cross-organizational sequence alignment between unmatched keys may be performed at blocks 324-332 of the method 300. Referring now to FIG. 3C, at block 324 of the method 300, the engine 122 may execute the algorithm 124 to determine whether at least two sets of key-value attribute pairs with unmatched key(s) exists. In response to a negative determination at block 324, the method 300 may proceed to block 334 and the cross-organizational sequence alignment sub-process may be skipped. This is because at least two sets of key-value attribute pairs with unmatched keys may be necessary to perform cross-organizational sequence alignment.

In response to a positive determination at block 324, however, a check may be performed at block 326 of the method 300 to determine whether sequence alignment of the keys has already been performed across the sets of key-value attribute pairs with unmatched key(s). A positive determination at block 326 indicates that cross-organizational sequence alignment has been performed, in response to which, the method 300 may proceed to block 334. In response to a negative determination at block 326, however, the engine 122 may execute the algorithm 124 to perform a sequence alignment of each key in each set of key-value attribute pairs with unmatched key(s) to each other key in each other set of key-value attribute pairs with unmatched key(s) to determine a respective edit distance for each pairing of keys to which the sequence alignment is applied.

The engine 122 may then execute the algorithm 124 to determine, at block 330 of the method 300, whether any subset of keys exists for which the respective edit distance for each pairing of keys in the subset is less than a threshold value. If any such subset exits (a positive determination at block 330), a respective shared output mapping entry may be created at block 332 of the method 300 for each such subset. A shared output mapping entry created at block 332 may include a shared key common to a particular subset of organization-specific keys, the subset of keys themselves, and organization-specific key values associated with the subset of keys. From block 332, the method 300 may again proceed to block 308. The method 300 may also proceed to block 308 in response to a negative determination at block 330.

The cross-organizational sequence alignment sub-process of blocks 324-332 will now be described in connection with the example introduced earlier. At this stage of execution of the entity key-value attribute pair sequence alignment algorithm 124, the sets of key-value attribute pairs with unmatched key(s) include $A_1$ with unmatched keys "fontsize" and "lang"; $A_2$ with unmatched keys "fontsze" and "language"; and $A_3$ with unmatched keys "font" and communicationpref" Further, the shared output mapping 126 still contains a single entry having the shared key "dispMode" and the organization-specific keys "dispMode" from $A_1$, "dispMode" from $A_2$, and "displayMode" from $A_3$.

In this example, a positive determination would be made at block 324 because there are at least two (in fact three in this example) sets of key-value attribute pairs with unmatched keys. Further, because this is the first iteration of the cross-organizational sequence alignment sub-process, a negative determination would be made at block 326. Cross-organizational sequence alignment would then be performed for each key with respect to each other key across the sets $A_1$, $A_2$, and $A_3$. The resulting edit distances would then be evaluated at block 330 to determine whether any subset of unmatched keys exists for which each unique pairing of keys is associated with a respective edit distance that is less than a threshold edit distance. A shared output mapping entry would then be created at block 332 for each such subset.

For example, a subset of keys containing "fontsize" from $A_1$, "fontsze" from $A_2$, and "font" from $A_3$ may satisfy the requirements of block 332. In particular, an edit distance between "fontsize" and "fontsze," an edit distance between "fontsize" and "font," and an edit distance between "fontsze" and "font" may each be less than the threshold edit distance. If this is the case, a new shared output mapping entry may be created for this subset of keys at block 332. The entry may contain each of the organization-specific keys "fontsize," "fontsze," and "font" as well as their organization-specific key values. In addition, organization ids may be included in the entry for each organization associated with a set of key-value attribute pairs to which an organization-specific key in the entry belongs ($A_1$, $A_2$, and $A_3$ for this example entry). The new entry may also contain a shared key that collectively represents each of the organization-specific keys. In certain example embodiments, the shared key may be selected to be the organization-specific key in the entry that has the greatest string length, for example. Thus, in this example, "fontsize" may be selected as the shared key.

Similarly, a subset of keys containing "lang" from $A_1$ and "language" from $A_2$ may also satisfy the requirements of block 330. That is, an edit distance between "lang" and "language" may be less than a threshold edit distance, in which case, a shared output mapping entry may be created at block 332 that includes the organization-specific keys "lang" and "language," their corresponding organization-specific key values, and organization ids for ORG_X and ORG_Y, which are associated with sets $A_1$ and $A_2$, respectively. The shared key may be selected to be the key having the longer string length: "language." The organization-specific key "communicationpref" in set $A_3$ may not be included in the subset containing "lang" and "language" because an edit distance between "communicationpref" and "lang" and/or an edit distance between "communicationpref" and "language" may not satisfy the threshold edit distance (may be greater than or equal to the threshold edit distance). Thus, "communicationpref" may not be included at this stage in the shared output mapping entry that is created.

In certain example embodiments, language translation of the unmatched keys that are being compared across organizations may be performed if determined to be advantageous. The language translation may be performed prior to and/or subsequent to the cross-organizational sequence alignment. In certain example embodiments, if the language translation is performed subsequent to the cross-organizational sequence alignment, the sequence alignment may be repeated.

In the example being described throughout this disclosure, at this stage of execution of the entity key-value attribute pair sequence alignment algorithm 124, the only remaining set with unmatched key(s) is set $A_3$ with unmatched key "communicationpref" Further, an example JSON representation of the shared output mapping 126 at this stage of execution of the algorithm 124 is shown below.

```
{
    "Jane Iyer": {
        "dispMode": {
            "keyValuePairs": [{
                "organization_id": "CompanyX",
                "organization_key": "dispMode",
                "organization_value": "grayscale"
            }, {
                "organization_id": "CompanyY",
                "organization_key": "dispMode",
                "organization_value": "grayscale"
            }, {
                "organization_id": "CompanyZ",
                "organization_key": "displayMode",
                "organization_value": "NULL"
            }]
        }
        "fontsize": {
            "keyValuePairs": [{
                "organization_id": "CompanyX",
                "organization_key": "fontsize",
                "organization_value": "12"
            }, {
                "organization_id": "CompanyY",
                "organization_key": "fontsze",
                "organization_value": "12"
            }, {
                "organization_id": "CompanyZ",
                "organization_key": "font",
                "organization_value": "NULL"
            }]
        }
        "language": {
            "keyValuePairs": [{
                "organization_id": "CompanyX",
                "organization_key": "lang",
                "organization_value": "English"
            }, {
                "organization_id": "CompanyY",
                "organization_key": "language",
                "organization_value": "English"
            }]
        }
    }
}
```

After creation of the new shared output mapping entry having the shared key "language" at block 332, the method may proceed to block 308. A positive determination may be made at block 308 because set $A_3$ still has the unmatched key "communicationpref" Further, because sequence alignment has already been performed with respect to existing organization-specific keys in the shared output mapping 126, a negative determination may be made at block 310. The method 300 may then proceed to block 324. Because only the single set $A_3$ remains with an unmatched key, a negative determination may be made at block 324, and the method 300 may proceed to block 334. The method 300 may also proceed to block 334 in response to a positive determination at block 324 and a negative determination at block 326. That is, even if there were more than one set of key-value attribute pairs with unmatched key(s), the method 300 would nonetheless proceed to block 334 because cross-organizational sequence alignment has already been performed.

At block 334, a determination may be made as to whether sequence alignment of key values has already been performed with respect to existing key values in the shared output mapping 126. At this stage of execution of the entity key-value attribute pair sequence alignment algorithm 124, sequence alignment of key values corresponding to unmatched key(s) with respect to existing key values in the shared output mapping 126 has not been performed, and thus, the method 300 may proceed to block 336. A sub-process for sequence alignment of key values corresponding to unmatched key(s) with respect to existing key values in the shared output mapping 126 may then be performed at blocks 336-344.

At block 336 of the method 300, the engine 122 may determine whether all entries in the shared output mapping 126 have been selected for the sequence alignment sub-process of blocks 336-344. A positive determination at block 336 indicates that all entries have been selected and that the sequence alignment sub-process of blocks 336-344 is complete, and the method 300 may proceed to block 346. In the example being described, the sequence alignment sub-process of blocks 336-344 has not yet been performed, and thus, a negative determination may be made at block 336.

Then, at block 338 of the method 300, a previously unselected entry in the shared output mapping 126 may be selected. From block 338, the method 300 may proceed to block 340 where a sequence alignment of each key value in each of set of key-value attribute pairs with unmatched key(s) may be performed with respect to each organization-specific key value in the selected shared output mapping entry to determine a respective edit distance for each pairing of key values to which the sequence alignment is applied. The engine 122 may then determine, at block 342 of the method 300, whether there exists any key value in a set of key-value attribute pairs with unmatched key(s) for which the respective edit distance for each pairing of the key value with each organization-specific key value in the selected shared output mapping entry is less than a threshold value (e.g., a threshold edit distance). It should be appreciated that the respective edit distance may only be required to be less than the threshold value with respect to some threshold number of organization-specific key values in the selected entry, which may be less than the total number of organization-specific key values in the selected entry.

In response to a positive determination at block 342, the key value that has a respective edit distance with respect to each organization-specific key value in the selected shared output mapping entry that is less than a threshold value may be added to the selected shared output mapping entry at block 344 of the method 300. In addition, the key corresponding to the key value as well as an organization id corresponding to the organization associated with the set of key-value attribute pairs that contains the key value may also be added to the selected shared output mapping entry. From block 344, the method 300 may proceed to block 336 and the sequence alignment sub-process of blocks 336-344 may continue iteratively until all entries in the shared output mapping 126 have been selected, at which the point, a negative determination may be made at block 336 and the method 300 may again proceed to block 308.

In continuing reference to the example introduced earlier, the entry having the shared key "dispMode" may be selected at block 338 at an initiation of the sequence alignment sub-process of blocks 336-344. The edit distance between the sole key value "English" in the sole remaining set of key-value attribute pairs with unmatched key(s) and each key value in the entry having the shared key "dispMode" may not be less than the threshold edit distance, and thus, a negative determination may be made at block 342, causing the method 300 to return to block 336. This may be due to the key value "English" being highly dissimilar from the organization-specific key values "grayscale" and "NULL" in the selected shared output mapping entry. In certain example embodiments, a "NULL" key value may be excluded from consideration when applying sequence alignment to key values.

Because additional shared output mapping entries remain that have not been selected during the iterative sub-process of blocks 336-344, a negative determination may again be made at block 336, and the method 300 may proceed to block 338, where a previously unselected shared output mapping entry may be selected. For example, the shared output mapping entry having the shared key "fontsize" may be selected. The edit distance between the key value "English" and each key value in the entry having the shared key "fontsize" may also not be less than the threshold edit distance, and thus, a negative determination may again be made at block 342, causing the method 300 to again return to block 336. This may be due to the key value "English" being highly dissimilar from the organization-specific key values "12" in the selected shared output mapping entry.

Because additional shared output mapping entries remain that have not been selected during the iterative sub-process of blocks 336-344, a negative determination may again be made at block 336, and the method 300 may again proceed to block 338, where a previously unselected shared output mapping entry may be selected. For example, the shared output mapping entry having the shared key "language" may be selected. The engine 122 may then execute the algorithm 124 to perform a sequence alignment of the key value "English" with respect to each of the organization-specific key values included in the selected shared output mapping entry (e.g., "English" from set $A_1$ and "English" from set $A_2$) to determine a respective edit distance for each pairing of key values to which the sequence alignment is applied. Because the key values are identical, the edit distance would be less than the threshold edit distance, and the key value "English" along with its corresponding key in set $A_3$ "communicationpref" would be added to the shared output mapping entry containing the shared key "language." In this manner, although the sequence alignment with respect to keys did not identify the organization-specific key "communicationpref" as being conceptually similar to the organization-specific keys "lang" and "language," the sequence alignment performed with respect to key values was able to identify the conceptual similarity.

The method 300 may then return to block 336, where a negative determination may be made because all shared output mapping entries have now been selected for sequence alignment as part of the sub-process of blocks 336-344. The method 300 may then proceed to block 308 to determine whether any set with unmatched key(s) remains. In the example being described, no set with unmatched key(s) remains, and thus, a negative determination may be made at block 308 and the method 300 may end and the pruning phase may be initiated at block 402 of the method 400. At the conclusion of execution of the entity key-value attribute pair sequence alignment algorithm 124 in the example being described, the shared output mapping 126 may contain the following data, illustratively shown using a JSON representation.

```
{
    "Jane Iyer": {
        "dispMode": {
            "keyValuePairs": [{
                "organization_id": "CompanyX",
                "organization_key": "dispMode",
                "organization_value": "grayscale"
            }, {
                "organization_id": "CompanyY",
                "organization_key": "dispMode",
                "organization_value": "grayscale"
            }, {
                "organization_id": "CompanyZ",
                "organization_key": "displayMode",
                "organization_value": "NULL"
            }]
        }
        "fontsize": {
            "keyValuePairs": [{
                "organization_id": "CompanyX",
                "organization_key": "fontsize",
                "organization_value": "12"
            }, {
                "organization_id": "CompanyY",
                "organization_key": "fontsze",
                "organization_value": "12"
            }, {
                "organization_id": "CompanyZ",
                "organization_key": "font",
                "organization_value": "NULL"
            }]
        }
        "language": {
            "keyValuePairs": [{
                "organization_id": "CompanyX",
                "organization_key": "lang",
                "organization_value": "English"
            }, {
                "organization_id": "CompanyY",
                "organization_key": "language",
                "organization_value": "English"
            }, {
                "organization_id": "CompanyZ",
                "organization_key": "communicationpref",
                "organization_value": "English"
            }]
        }
    }
}
```

If, however, one or more sets of key-value attribute pairs with unmatched key(s) remains, a positive determination may be made at block 308. This may be followed by 1) a negative determination at block 310, 2) a positive determination at block 324 followed by a positive determination at block 326 (or a negative determination at block 324), and 3) a positive determination at block 334 to arrive at block 346. At block 346 of the method 300, a determination may be made as to whether at least two sets of key-value attribute pairs with unmatched key(s) remain. If less than two sets of key-value attribute pairs with unmatched key(s) remain, cross-organizational key-value sequence alignment cannot be performed, and the method 300 may end. The pruning phase of the algorithm 124 may then be initiated at block 402 of the method 400 depicted in FIG. 4.

In response to a positive determination at block 346 indicating that cross-organizational key value sequence alignment can be performed, the engine 122 may execute the algorithm 124 at block 348 of the method 300 to perform a sequence alignment of each key value in each set of key-value attribute pairs with unmatched key(s) with each key value in each other set of key-value attribute pairs with unmatched key(s) to determine a respective edit distance for each pairing of key values to which the sequence alignment is applied.

A determination may then be made at block 350 of the method 300 as to whether there exists any subset of key values for which the respective edit distance for each pairing of key values in the subset is less than a threshold value. If a positive determination is made at block 350, a new shared output mapping entry may be created. The new entry may contain the subset of key values identified at block 350 as well as their corresponding organization-specific keys. In addition, as previously described, organization ids corresponding to organizations associated with the organization-specific keys and key values may also be added to the shared output mapping entry. Further, a shared key may be selected to collectively represent the organization-specific keys in the entry. Any suitable criteria may be used to select the shared key for an entry in the shared output mapping 126. For example, the organization-specific key having the greatest string length may be selected as the shared key.

Following block 352, the method 300 may end, and the pruning phase of the algorithm 124 may then be initiated at block 402 of the method 400. Alternatively, in response to a negative determination at block 350, the method 300 may also end, but without creating a new entry in the shared output mapping 126 because no subset was identified at block 350.

For the purposes of further explaining cross-organizational key value sequence alignment, assume that sets $A_1$, $A_2$, and $A_3$ also contain the organization-specific keys "screenresolution," "screenres," and "resolution," respectively. Further assume that these keys are respectively associated with the identical key value "300 dpi," or at the least, similar key values. Moreover, assume than one or more edit distances between pairings of the organization-specific keys does not meet the threshold edit distance, and thus, these keys have not yet been identified as being conceptually aligned and no shared output mapping entry has been generated containing any of these keys.

In this example, a positive determination would be made at block 346, and the method 300 would proceed to block 348, wherein the engine 122 may execute the algorithm 124 to perform a cross-organizational sequence alignment of the key values corresponding to the organization-specific keys "screenresolution," "screenres," and "resolution." Because the key values are assumed to be identical or highly similar, each of the edit distances would meet the threshold edit distance at block 350, and a new shared output mapping entry containing each of the organization-specific keys "screenresolution," "screenres," and "resolution" and their corresponding key values would be created at block 352. In this manner, the organization-specific keys "screenresolution," "screenres," and "resolution" may be determined to be conceptually aligned based on their corresponding key values despite the keys themselves being dissimilar. An example JSON representation of the shared output mapping entry that may be created at block 352 in this example is shown below.

```
"screenresolution": {
    "keyValuePairs": [{
        "organization_id": "CompanyX",
        "organization_key": "screenresolution",
        "organization_value": "300 dpi"
    }, {
```

```
            "organization_id": "CompanyY",
            "organization_key": "screenres",
            "organization_value": "300 dpi"
        }, {
            "organization_id": "CompanyZ",
            "organization_key": "resolution",
            "organization_value": "300 dpi"
        }]
    }
```

It should be appreciated that, in certain example embodiments, language translation of the key values that correspond to unmatched keys and that are being compared to existing key values in the shared output mapping or that are being compared to each other cross-organizationally may be performed if determined to be advantageous. The language translation may be performed prior to and/or subsequent to the sequence alignment with respect to existing key values in the shared output mapping or the cross-organizational sequence alignment. In certain example embodiments, if the language translation is performed subsequent to the sequence alignment with respect to existing key values in the shared output mapping and/or subsequent to the cross-organizational sequence alignment, the sequence alignment(s) may be repeated.

At the conclusion of block 352, any remaining unmatched key(s) in any of sets $A_1, A_2, \ldots, A_N$ that do not correspond to shared keys in the shared output mapping 126 have not met the criteria of the direct match or fuzzy match comparisons of the algorithm 124. In certain example embodiments, a manual, brute-force comparison may be performed for any such unmatched key(s) that remain to compare the unmatched key(s) across the sets of key-value pairs and/or to keys already included in the shared output mapping 126 and manually add the unmatched key(s) to existing entries in the shared output mapping 126 and/or to create new entries for the unmatched key(s).

In certain example embodiments, although keys contained in a same shared output mapping entry have been determined to be conceptually aligned, the organization-specific key values corresponding to these keys may convey vastly different meaning for each organization id and/or the organization-specific values within a shared output mapping entry may conflict with other key values across the sets $A_1, A_2, \ldots, A_N$. In such example embodiments, the method 400 depicted in FIG. 4 may be performed to prune the shared output mapping 126 to identify highly dissimilar key values in a same shared output mapping entry and/or resolve conflicts between key values.

Referring now to FIG. 4, at block 402 of the method 400, the engine 122 may execute the algorithm 124 to perform a sequence alignment of the organization-specific key values in each entry in the shared output mapping 126 to generate a respective set of edit distances for each entry. At block 404 of the method 400, a determination may then be made as to whether, for any given shared output mapping entry, any organization-specific key value in the entry is associated with a threshold number of edit distances that are greater than a threshold value, such as a threshold edit distance. In response to a positive determination at block 404, each such organization-specific key value identified at block 404 may be flagged as a low confidence value at block 406 of the method 400.

As a non-limiting example, assume that the shared output mapping entry associated with the shared key "language" in the ongoing example described throughout this disclosure further included an additional organization-specific key determined to be conceptually aligned with the other organization-specific keys in the entry and that corresponds to the key value "Spanish." The edit distance between the key value "Spanish" and each of the other organization-specific key values in the entry (e.g., "English") may be greater than the threshold value, and thus, a positive determination may be made at block 404, and the organization-specific key value "Spanish" may be flagged as a low confidence value. It should be appreciated that a key value need not have an edit distance that is greater than the designated threshold edit distance with respect to every other key value in the shared output mapping entry in order to be flagged as a low confidence value. In various example embodiments, it may be sufficient for a key value to have a respective edit distance that does not meet the threshold edit distance with respect to some threshold number of pairings with other key values in the shared output mapping entry, where the threshold number of pairings may be less than the total number of possible pairings.

From block 406, the method 400 may proceed to block 408. The method 400 may also proceed directly to block 408 in response to a negative determination at block 404. At block 408 of the method 400, a heuristics-based approach may be applied by evaluating a set of criteria to resolve conflicts across organization-specific key values in each shared output mapping entry by assigning a respective ranking to each organization-specific key value to denote a quality of the key value. A determination may then be made at block 410 of the method 400 as to whether any organization-specific key value has been associated with a ranking that is below a threshold ranking. In response to a positive determination at block 410, each such key value identified at block 410 may be flagged as a low confidence value at block 412 of the method 400. The method 400 may then end. The method 400 may also end in response to a negative determination at block 410. In certain example embodiments, a manual, brute-force comparison may be performed for each organization-specific key value that is flagged as low confidence, using, for example, a human-in-the-middle approach to compare organization-specific key values across a shared output mapping entry and manually prune conceptually dissimilar organization-specific key values from the entry.

Referring again to the continuing example discussed throughout this disclosure, Company Z has access to user Jane's shared preferences across other organizations in the blockchain 102 via the shared output mapping 126. Thus, despite several of the Company Z-specific keys for user Jane having a "NULL" value, Company Z can access the shared output mapping 126 and identify user Jane's preferences across various organizations in the blockchain 102 without requiring her to provide them again. For example, if user Jane were to initiate a purchase transaction at Company Z, the UI may be presented in grayscale and the text may be presented in English with a font size of 12 pt based on the information available to Company Z via the shared output mapping 126. In this manner, user Jane is provided with a seamless user experience across different organizations in the blockchain 102 despite the different organizations storing different data for user Jane in accordance with different labelling conventions.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 5:
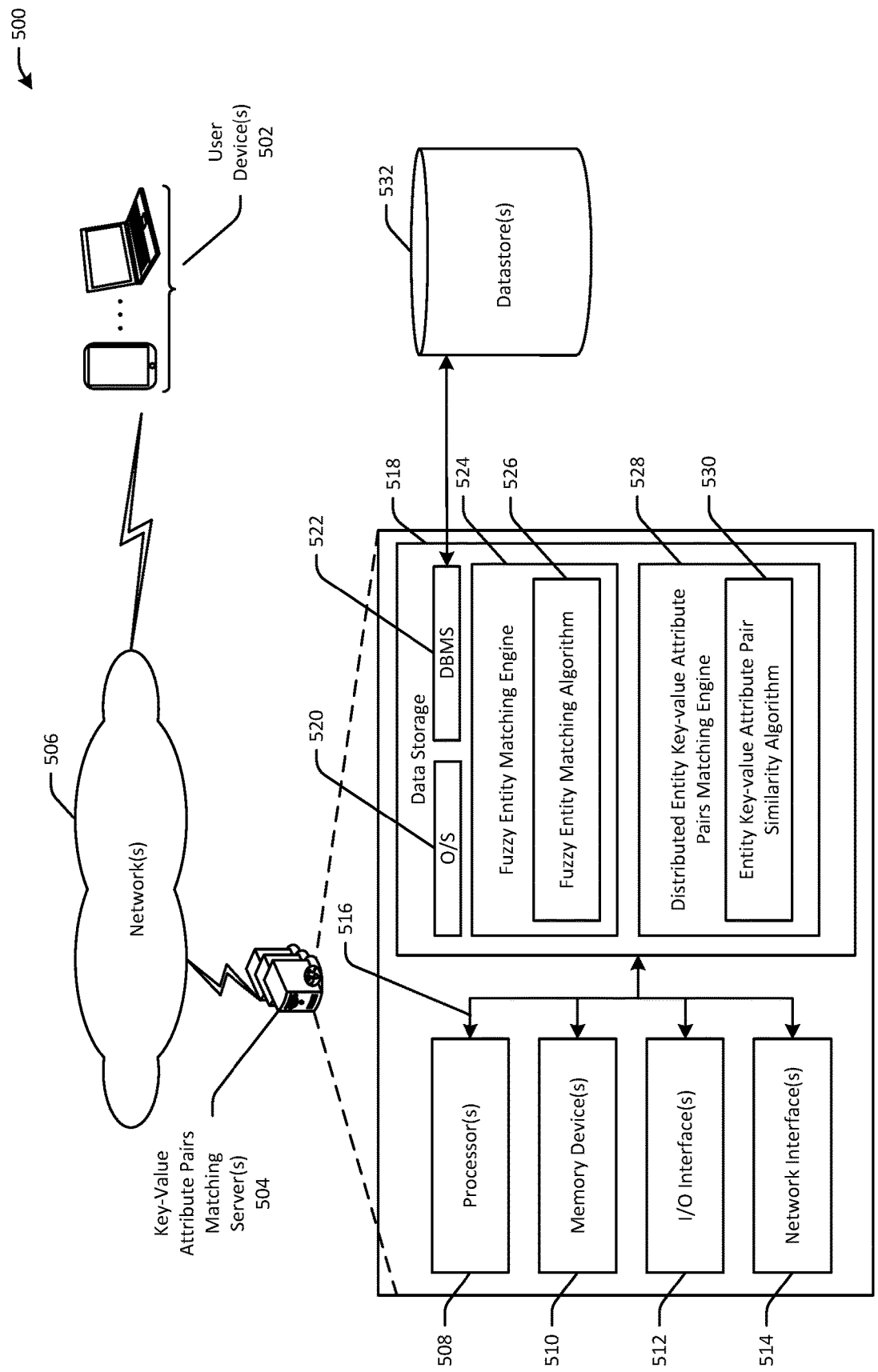
FIG. 5 is a schematic diagram of an illustrative networked architecture configured to implement one or more example embodiments of the disclosure.

FIG. 5 is a schematic diagram of an illustrative networked architecture 500 configured to implement one or more example embodiments of the disclosure. For example, in the illustrative implementation depicted in FIG. 5, the networked architecture 500 includes one or more user devices 502 and one or more key-value attribute pair matching servers 504. The user device(s) 502 may include any suitable user device such as, for example, a personal computer (PC), a tablet, a smartphone, a wearable device, or the like. The user device(s) 502 may include any device that a user may use to access systems associated with organizations in a blockchain, for example. While any particular component of the networked architecture 500 may be described herein in the singular (e.g., a key-value attribute pair matching server 504 or simply a server 504), it should be appreciated that multiple instances of any such component may be provided, and functionality described in connection with a particular component may be distributed across multiple ones of such a component.

The server(s) 504 and the user device(s) 502 may be configured to communicate via one or more networks 506. The network(s) 506 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. The network(s) 506 may have any suitable communication range associated therewith and may include, for example, global networks (e.g., the Internet), metropolitan area networks (MANs), wide area networks (WANs), local area networks (LANs), or personal area networks (PANs). In addition, the network(s) 1208 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the server 504 may include one or more processors (processor(s)) 508, one or more memory devices 510 (generically referred to herein as memory 510), one or more input/output ("I/O") interface(s) 512, one or more network interfaces 514, and data storage 518. The server 504 may further include one or more buses 516 that functionally couple various components of the server 504.

The bus(es) 516 may include at least one of a system bus, a memory bus, an address bus, or a message bus, and may permit the exchange of information (e.g., data (including computer-executable code), signaling, etc.) between various components of the server 504. The bus(es) 516 may include, without limitation, a memory bus or a memory controller, a peripheral bus, an accelerated graphics port, and so forth. The bus(es) 516 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 510 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 510 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 510 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 518 may include removable storage and/or non-removable storage including, but not limited to, magnetic storage, optical disk storage, and/or tape storage. The data storage 518 may provide non-volatile storage of computer-executable instructions and other data. The memory 510 and the data storage 518, removable and/or non-removable, are examples of computer-readable storage media (CRSM) as that term is used herein.

The data storage 518 may store computer-executable code, instructions, or the like that may be loadable into the memory 510 and executable by the processor(s) 508 to cause the processor(s) 508 to perform or initiate various operations. The data storage 518 may additionally store data that may be copied to memory 510 for use by the processor(s) 508 during the execution of the computer-executable instructions. Moreover, output data generated as a result of execution of the computer-executable instructions by the processor(s) 508 may be stored initially in memory 510 and may ultimately be copied to data storage 518 for non-volatile storage.

More specifically, the data storage 518 may store one or more operating systems (O/S) 520; one or more database management systems (DBMS) 522 configured to access the memory 510 and/or one or more external datastores 532; and one or more program modules, applications, engines, managers, computer-executable code, scripts, or the like such as, for example, a fuzzy entity matching engine 524 and a distributed entity key-value attribute pairs matching engine 528. The fuzzy entity matching engine 524 and the distributed entity key-value attribute pairs matching engine 528 may be configured to execute a fuzzy entity matching algorithm 526 and an entity key-value attribute pair sequence alignment algorithm 530, respectively. Any of the components depicted as being stored in data storage 518 may include any combination of software, firmware, and/or hardware. The software and/or firmware may include computer-executable instructions (e.g., computer-executable program code) that may be loaded into the memory 510 for execution by one or more of the processor(s) 508 to perform any of the operations described earlier in connection with correspondingly named modules, engines, algorithms, or the like.

Although not depicted in FIG. 5, the data storage 518 may further store various types of data utilized by components of the server 504 (e.g., sets of key-value attribute pairs, shared output mappings for one or more entities (e.g., users), and so forth). Any data stored in the data storage 518 may be loaded into the memory 510 for use by the processor(s) 508 in executing computer-executable instructions. In addition, any data stored in the data storage 518 may potentially be stored in the external datastore(s) 532 and may be accessed via the DBMS 522 and loaded in the memory 510 for use by the processor(s) 508 in executing computer-executable instructions.

The processor(s) 508 may be configured to access the memory 510 and execute computer-executable instructions loaded therein. For example, the processor(s) 508 may be configured to execute computer-executable instructions of the various program modules, applications, engines, managers, or the like of the server 504 to cause or facilitate various operations to be performed in accordance with one or more embodiments of the disclosure. The processor(s) 508 may include any suitable processing unit capable of accepting data as input, processing the input data in accordance with stored computer-executable instructions, and generating output data. The processor(s) 508 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 508 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 508 may be capable of supporting any of a variety of instruction sets.

Referring now to other illustrative components depicted as being stored in the data storage 518, the O/S 520 may be loaded from the data storage 518 into the memory 510 and may provide an interface between other application software executing on the server 504 and hardware resources of the server 504. More specifically, the O/S 520 may include a set of computer-executable instructions for managing hardware resources of the server 504 and for providing common services to other application programs. In certain example embodiments, the O/S 520 may include or otherwise control execution of one or more of the program modules, engines, managers, or the like depicted as being stored in the data storage 518. The O/S 520 may include any operating system now known or which may be developed in the future including, but not limited to, any server operating system, any mainframe operating system, or any other proprietary or non-proprietary operating system.

The DBMS 522 may be loaded into the memory 510 and may support functionality for accessing, retrieving, storing, and/or manipulating data stored in the memory 510, data stored in the data storage 518, and/or data stored in external datastore(s) 532. The DBMS 522 may use any of a variety of database models (e.g., relational model, object model, etc.) and may support any of a variety of query languages. The DBMS 522 may access data represented in one or more data schemas and stored in any suitable data repository. External datastore(s) 532 that may be accessible by the server 504 via the DBMS 522 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the server 504, the input/output (I/O) interface(s) 512 may facilitate the receipt of input information by the server 504 from one or more I/O devices as well as the output of information from the server 504 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the server 504 or may be separate. The I/O devices may further include, for example, any number of peripheral devices such as data storage devices, printing devices, and so forth.

The I/O interface(s) 512 may also include an interface for an external peripheral device connection such as universal serial bus (USB), FireWire, Thunderbolt, Ethernet port or other connection protocol that may connect to one or more networks. The I/O interface(s) 512 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The server 504 may further include one or more network interfaces 514 via which the server 504 may communicate with any of a variety of other systems, platforms, networks, devices, and so forth. The network interface(s) 514 may enable communication, for example, with one or more other devices via one or more of the network(s) 506.

It should be appreciated that the program modules/engines depicted in FIG. 5 as being stored in the data storage 518 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the server 504 and/or other computing devices accessible via the network(s) 506, may be provided to support functionality provided by the modules depicted in FIG. 5 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 5 may be implemented, at least partially, in hardware and/or firmware across any number of devices.

It should further be appreciated that the server 504 may include alternate and/or additional hardware, software, or firmware components beyond those described or depicted without departing from the scope of the disclosure. More particularly, it should be appreciated that software, firmware, or hardware components depicted as forming part of the server 504 are merely illustrative and that some components may not be present or additional components may be provided in various embodiments. While various illustrative modules have been depicted and described as software modules stored in data storage 518, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 200-400 may be performed by a server 504 having the illustrative configuration depicted in FIG. 5, or more specifically, by one or more program modules, engines, applications, or the like executable on such a device. It should be appreciated, however, that such operations may be implemented in connection with numerous other device configurations.

The operations described and depicted in the illustrative methods of FIGS. 2-4 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 2-4 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for distributed matching and association of key-value attribute pairs, the method comprising:

receiving, by a processor from a requestor, a query for attributes associated with a target entity;

accessing, by a processor from a governed blockchain, aggregate key-value attribute pairs associated with a plurality of entities;

identifying a subset of the aggregate key-value attribute pairs that correspond to the target entity, the subset of the aggregate key-value attribute pairs comprising a first set of key-value attribute pairs associated with a first organizational entity and a second set of key-value attribute pairs associated with a second organizational entity;

executing a key-value pair similarity algorithm on the subset of the aggregate key-value attribute pairs to generate a shared output mapping, wherein one or more cross disjoint organizational entities, in the governed blockchain, access the generated shared output mapping and retrieves information known to other cross disjoint organizational entities about the target;

sending a response to the query to the requestor, the response comprising at least a portion of the shared output mapping, wherein executing the key-value pair similarity algorithm comprises executing a fuzzy entity matching engine by the processor to perform:

determining that a first key in a first key-value attribute pair in the first set of key-value attribute pairs does not exactly match the second key in a second key-value attribute pair in the second set of key-value attribute pairs;

determining an edit distance between the first key and the second key;

determining that the edit distance is less than a threshold value;

determining that the first key has a longer string length than the second key;

selecting the first key as a shared key for the first key-value attribute pair and the second key-value attribute pair; and generating an entry in the shared output mapping, the entry comprising the shared key, the first key-value attribute pair, and the second key-value attribute pair;

performing a sequence alignment of organization-specific key values in an entry of the shared output mapping to generate a set of edit distances, the sequency alignment comprising a lexical comparison of keys for the plurality of entities;

determining a first subset of the set of edit distances that are associated with a particular organization-specific key value;

determining a second subset of the first subset of edit distances that are greater than a threshold value;

determining that the second subset of the first subset of edit distances includes at least a threshold number of edit distances; and flagging the particular organization-specific key value as a low confidence value;

wherein the subset of the aggregate key-value attribute pairs further comprises a third set of key-value attribute pairs associated with a third organization entity, and wherein executing the key-value pair similarity algorithm further comprises:

determining that a third key in a third key-value attribute pair in the third set of key-value attribute pairs does not exactly match the first key;

determining an edit distance between the first key and the third key;

determining that the edit distance is less than a threshold value; and adding the third key and a third value associated with the third key to the entry in the shared output mapping;

determining unmatched keys for keys of key-value attribute pairs in the first set of key-value attribute pairs do not exactly match keys of key-value attribute pairs in the second set of key-value attribute pairs;

wherein the key-value pair similarity algorithm is executed utilizing a plurality of pointers, wherein the plurality of pointers track which sets of key-value attribute pairs with unmatched keys have or have not been selected and which shared output mapping entries have or have not been selected for comparison, wherein a first pointer in the plurality of pointers is updated to point to a next unselected set of key-value attribute pairs with unmatched keys until no set with unmatched keys remains.

2. The computer-implemented method of claim 1, further comprising:

determining that the requestor is associated with the first organizational entity;

determining an access policy associated with the first organizational entity; and determining the at least a portion of the shared output mapping that the requestor is authorized to received based at least in part on the access policy.

3. The computer-implemented method of claim 1, wherein executing the key-value pair similarity algorithm comprises:

determining that a first key in a first key-value attribute pair in the first set of key-value attribute pairs exactly matches a second key in a second key-value attribute pair in the second set of key-value attribute pairs; and generating an entry in the shared output mapping, the entry comprising a shared key, the first key-value attribute pair, and the second key-value attribute pair, wherein the shared key exactly matches the first key and the second key.

4. The computer-implemented method of claim 1, wherein executing the key-value pair similarity algorithm comprises:

determining a set of edit distances between a first key value in a first key-value attribute pair in the first set of key-value attribute pairs and a set of key values contained in an entry in the shared output mapping;

determining a subset of the set of edit distances that are less than a threshold value;

determining that the subset of the set of edit distances includes at least a threshold number of edit distances; and adding the first key-value attribute pair to the entry in the shared output mapping.

5. A system for distributed matching and association of key-value attribute pairs, the system comprising:

at least one memory storing computer-executable instructions; and at least one processor configured to access the at least one memory and execute the computer-executable instructions to:

receive, from a requestor, a query for attributes associated with a target entity;

access, from a governed blockchain, aggregate key-value attribute pairs associated with a plurality of entities;

identify a subset of the aggregate key-value attribute pairs that correspond to the target entity, the subset of the aggregate key-value attribute pairs comprising a first set of key-value attribute pairs associated with a first organizational entity and a second set of key-value attribute pairs associated with a second organizational entity;

execute a key-value pair similarity algorithm on the subset of the aggregate key-value attribute pairs to generate a shared output mapping, wherein one or more cross disjoint organizational entities, in the governed blockchain, access the generated shared output mapping and retrieves information known to other cross disjoint organizational entities about the target;

send a response to the query to the requestor, the response comprising at least a portion of the shared output mapping, wherein the at least one processor is configured to execute the key-value pair similarity algorithm by executing the computer-executable instructions to a fuzzy entity matching engine to perform:

determine that a first key in a first key-value attribute pair in the first set of key-value attribute pairs does not exactly match the second key in a second key-value attribute pair in the second set of key-value attribute pairs;

determine an edit distance between the first key and the second key;

determine that the edit distance is less than a threshold value;

determine that the first key has a longer string length than the second key;

select the first key as a shared key for the first key-value attribute pair and the second key-value attribute pair; and generate an entry in the shared output mapping, the entry comprising the shared key, the first key-value attribute pair, and the second key-value attribute pair;

perform a sequence alignment of organization-specific key values in an entry of the shared output mapping to generate a set of edit distances, the sequency alignment comprising a lexical comparison of keys for the plurality of entities;

determine a first subset of the set of edit distances that are associated with a particular organization-specific key value;

determine a second subset of the first subset of edit distances that are greater than a threshold value;

determine that the second subset of the first subset of edit distances includes at least a threshold number of edit distances; and flag the particular organization-specific key value as a low confidence value;

wherein the subset of the aggregate key-value attribute pairs further comprises a third set of key-value attribute pairs associated with a third organization entity, and wherein executing the key-value pair similarity algorithm further comprises:

determining that a third key in a third key-value attribute pair in the third set of key-value attribute pairs does not exactly match the first key;

determining an edit distance between the first key and the third key;

determining that the edit distance is less than a threshold value; and adding the third key and a third value associated with the third key to the entry in the shared output mapping;

determine unmatched keys for keys of key-value attribute pairs in the first set of key-value attribute pairs do not exactly match keys of key-value attribute pairs in the second set of key-value attribute pairs;

wherein the key-value pair similarity algorithm is executed utilizing a plurality of pointers, wherein the plurality of pointers track which sets of key-value attribute pairs with unmatched keys have or have not been selected and which shared output mapping entries have or have not been selected for comparison, wherein a first pointer in the plurality of pointers is updated to point to a next unselected set of key-value attribute pairs with unmatched keys until no set with unmatched keys remains.

6. The system of claim 5, wherein the at least one processor is further configured to execute the computer-executable instructions to:

determine that the requestor is associated with the first organizational entity;

determine an access policy associated with the first organizational entity; and determine the at least a portion of the shared output mapping that the requestor is authorized to received based at least in part on the access policy.

7. The system of claim 5, wherein the at least one processor is configured to execute the key-value pair similarity algorithm by executing the computer-executable instructions to:

determine that a first key in a first key-value attribute pair in the first set of key-value attribute pairs exactly matches a second key in a second key-value attribute pair in the second set of key-value attribute pairs; and generate an entry in the shared output mapping, the entry comprising a shared key, the first key-value attribute pair, and the second key-value attribute pair, wherein the shared key exactly matches the first key and the second key.

8. The system of claim 5, wherein the at least one processor is configured to execute the key-value pair similarity algorithm by executing the computer-executable instructions to:

determine a set of edit distances between a first key value in a first key-value attribute pair in the first set of key-value attribute pairs and a set of key values contained in an entry in the shared output mapping;

determine a subset of the set of edit distances that are less than a threshold value;

determine that the subset of the set of edit distances includes at least a threshold number of edit distances; and add the first key-value attribute pair to the entry in the shared output mapping.

9. A computer program product for distributed matching and association of key-value attribute pairs, the computer program product comprising a non-transitory storage medium readable by a processing circuit, the storage medium storing instructions executable by the processing circuit to cause a method to be performed, the method comprising:

receiving, from a requestor, a query for attributes associated with a target entity;

accessing, from a governed blockchain, aggregate key-value attribute pairs associated with a plurality of entities;

identifying a subset of the aggregate key-value attribute pairs that correspond to the target entity, the subset of the aggregate key-value attribute pairs comprising a first set of key-value attribute pairs associated with a first organizational entity and a second set of key-value attribute pairs associated with a second organizational entity;

executing a key-value pair similarity algorithm on the subset of the aggregate key-value attribute pairs to generate a shared output mapping, wherein one or more cross disjoint organizational entities, in the governed blockchain, access the generated shared output mapping and retrieves information known to other cross disjoint organizational entities about the target;

sending a response to the query to the requestor, the response comprising at least a portion of the shared output mapping, wherein executing the key-value pair similarity algorithm comprises executing a fuzzy entity matching engine by the processing circuit to perform:

determining that a first key in a first key-value attribute pair in the first set of key-value attribute pairs does not exactly match the second key in a second key-value attribute pair in the second set of key-value attribute pairs;

determining an edit distance between the first key and the second key;

determining that the edit distance is less than a threshold value;

determining that the first key has a longer string length than the second key;

selecting the first key as a shared key for the first key-value attribute pair and the second key-value attribute pair; and generating an entry in the shared output mapping, the entry comprising the shared key, the first key-value attribute pair, and the second key-value attribute pair;

performing a sequence alignment of organization-specific key values in an entry of the shared output mapping to generate a set of edit distances, the sequency alignment comprising a lexical comparison of keys for the plurality of entities;

determining a first subset of the set of edit distances that are associated with a particular organization-specific key value;

determining a second subset of the first subset of edit distances that are greater than a threshold value;

determining that the second subset of the first subset of edit distances includes at least a threshold number of edit distances; and flagging the particular organization-specific key value as a low confidence value;

wherein the subset of the aggregate key-value attribute pairs further comprises a third set of key-value attribute pairs associated with a third organization entity, and wherein executing the key-value pair similarity algorithm further comprises:

determining that a third key in a third key-value attribute pair in the third set of key-value attribute pairs does not exactly match the first key;

determining an edit distance between the first key and the third key;

determining that the edit distance is less than a threshold value; and adding the third key and a third value associated with the third key to the entry in the shared output mapping;

determining unmatched keys for keys of key-value attribute pairs in the first set of key-value attribute pairs do not exactly match keys of key-value attribute pairs in the second set of key-value attribute pairs;

wherein the key-value pair similarity algorithm is executed utilizing a plurality of pointers, wherein the plurality of pointers track which sets of key-value attribute pairs with unmatched keys have or have not been selected and which shared output mapping entries have or have not been selected for comparison, wherein a first pointer in the plurality of pointers is updated to point to a next unselected set of key-value attribute pairs with unmatched keys until no set with unmatched keys remains.

10. The computer program product of claim 9, wherein executing the key-value pair similarity algorithm comprises:

determining that a first key in a first key-value attribute pair in the first set of key-value attribute pairs exactly matches a second key in a second key-value attribute pair in the second set of key-value attribute pairs; and generating an entry in the shared output mapping, the entry comprising a shared key, the first key-value attribute pair, and the second key-value attribute pair, wherein the shared key exactly matches the first key and the second key.

11. The computer program product of claim 9, wherein executing the key-value pair similarity algorithm comprises:

determining a set of edit distances between a first key value in a first key-value attribute pair in the first set of key-value attribute pairs and a set of key values contained in an entry in the shared output mapping;

determining a subset of the set of edit distances that are less than a threshold value;

determining that the subset of the set of edit distances includes at least a threshold number of edit distances; and adding the first key-value attribute pair to the entry in the shared output mapping.

* * * * *